United States Patent [19]

Takagi et al.

[11] Patent Number: 5,692,064
[45] Date of Patent: Nov. 25, 1997

[54] METHOD AND APPARATUS FOR COUNTING UNDERWATER OBJECTS USING AN ULTRASONIC WAVE

[75] Inventors: Yoichi Takagi; Masayasu Kato, both of Hitachi; Takashi Miyakita; Katsuji Terazono, both of Tokyo; Shigeharu Jikan, Omiya; Takeo Tamezawa, Kawasaki; Toshiaki Hara, Otsu, all of Japan

[73] Assignee: Hitachi, Ltd., Tokyo, Japan

[21] Appl. No.: 330,156

[22] Filed: Oct. 27, 1994

[30] Foreign Application Priority Data

Nov. 1, 1993 [JP] Japan .................. 5-273647

[51] Int. Cl.$^6$ .............. G06K 9/00; G06K 9/32; G01N 29/04; G06M 7/00
[52] U.S. Cl. .............. 382/103; 382/100; 382/206; 73/624; 377/6
[58] Field of Search .............. 382/103, 100, 382/257, 206; 377/6, 5, 209; 73/624, 625

[56] References Cited

U.S. PATENT DOCUMENTS

| 4,023,135 | 5/1977 | Hanmura et al. | 340/1 C |
| 4,104,609 | 8/1978 | Minegushi et al. | 340/3 C |
| 4,112,419 | 9/1978 | Kinoshita et al. | 340/560 |
| 4,439,844 | 3/1984 | Menin | 367/87 |
| 4,628,520 | 12/1986 | Menger | 337/6 |
| 4,963,035 | 10/1990 | McCarthy | 382/206 |
| 5,005,192 | 4/1991 | Duss | 377/8 |

FOREIGN PATENT DOCUMENTS

| 1 129 981 | 8/1982 | Canada | G06M 11/00 |
| 1 171 951 | 7/1984 | Canada | G01B 17/00 |
| 1 205 175 | 5/1986 | Canada | G06M 1/27 |
| 63-141526A | 6/1988 | Japan | A61K 61/00 |
| 2212609 | 7/1989 | United Kingdom | B65G 51/36 |
| 2 212 614 | 7/1989 | United Kingdom | G01S 15/88 |

OTHER PUBLICATIONS

"A Designing of Fish Pass", Hirose et al., Sankaido Shuppan (see Specification p. 1).

*Primary Examiner*—Andrew Johns
*Assistant Examiner*—Monica S. Davis
*Attorney, Agent, or Firm*—Kenyon & Kenyon

[57] ABSTRACT

A number of fish may be counted by emitting an ultrasonic wave or an electromagnetic wave toward a predetermined area of a body of water where fish pass (e.g., a fish farming pool, a river or the like). Reflected waves are received from the fish bodies so that the reflected waves received from a cross section of the predetermined area are periodically stored. An ultrasonic wave fish shade image is produced that shows changes of fish shades. Fish are counted by performing an image processing which discriminates the ultrasonic wave fish shade image based on a predetermined fish shade decision rule. This arrangement reduces errors occuring due to muddiness and dust in the water and allows an automatic continuous fish counting ability over a long time period.

16 Claims, 24 Drawing Sheets

FISH MOVE DIRECTION

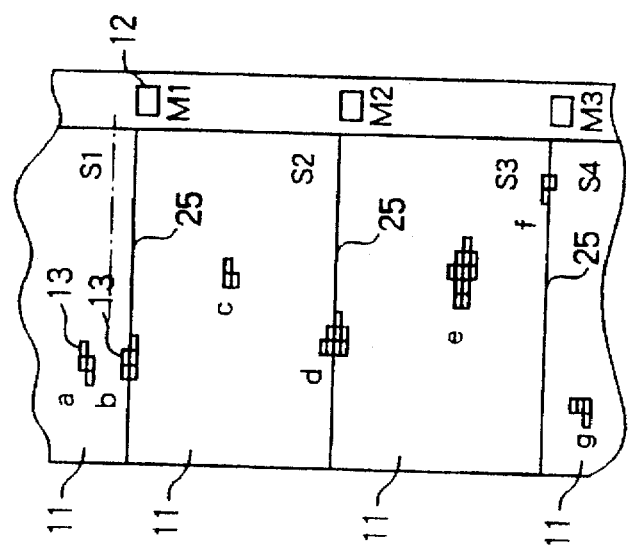

FIG. 17

| RULE $\Psi2$ (select2) DISTANCE BETWEEN FISH HEIGHT | DETAILED CONTENTS OF THE RULE |
|---|---|
| $\Psi2=0$ WHEN select2=1 | MERGE IS NOT CARRIED OUT IN THE TIME AXIS DIRECTION. TWO GROUPS OF FISH SHADES WITH A DISTANCE OF AT LEAST ONE PIXEL THEREBETWEEN ARE REGARDED AS DIFFERENT FISH SHADES.<br>―13  ←AT LEAST ONE PIXEL<br>ONE FISH SHADE  REGARDED AS DIFFERENT FISH SHADES |
| $\Psi2=0$ WHEN select2=2 | WHEN TWO GROUPS OF FISH SHADES ARE SEPARATED BY NOT MORE THAN ONE PIXEL THEREBETWEEN, THEY ARE MERGED AND REGARDED TO BE THE SAME FISH SHADE. WHEN THEY ARE SEPARATED BY AT LEAST TWO PIXELS THEREBETWEEN, THEY ARE NOT MERGED AND THEY ARE REGARDED AS DIFFERENT FISH SHADES<br>←NO MORE THAN ONE PIXEL→  ←AT LEAST TWO PIXELS<br>REGARDED AS ONE FISH SHADE  REGARDED AS DIFFERENT FISH SHADES |
| $\Psi2=0$ WHEN select2=m | WHEN TWO GROUPS OF FISH SHADES ARE SEPARATED BY NOT MORE THAN m PIXELS THEREBETWEEN, THEY ARE MERGED AND REGARDED TO BE THE SAME FISH SHADE. WHEN THEY ARE SEPARATED BY AT LEAST (m+1) PIXELS THEDEBETWEEN, THEY ARE NOT MERGED AND THEY ARE REGARDED AS DIFFERENT FISH SHADES<br>13―<br>←NO MORE THAN m PIXELS→  ←AT LEAST (m-1) PIXELS<br>REGARDED AS ONE FISH SHADE  REGARDED AS DIFFERENT FISH SHADES |

THIS SHOWS AN EXAMPLE OF THE CASE WHERE INFORMATION OF ONE SENSOR IS CORRESPONDED TO ONE PIXEL

FIG. 18

| RULE Ψ3 (select3) | DETAILED CONTENTS OF THE RULE |
|---|---|
| Ψ3 (When select 3=1) | MERGE IS NOT CARRIED OUT IN THE TIME AXIS DIRECTION. TWO GROUPS OF FISH SHADES WITH A DISTANCE OF AT LEAST ONE LINE THEREBETWEEN ARE REGARDED AS DIFFERENT FISH SHADES.<br><br>13 — ONE FISH SHADE  AT LEAST ONE LINE / REGAEDED AS DIFFERENT FISH SHADES |
| Ψ3 (When select 3=2) | WHEN TWO GROUPS OF FISH SHADES ARE SEPARATED BY NOT MORE THAN ONE LINE THEREBETWEEN, THEY ARE MERGED AND REGARDED TO BE THE SAME FISH SHADE. WHEN THEY ARE SEPARATED BY AT LEAST TWO LINES THEREBETWEEN, THEY ARE NOT MERGED AND THEY ARE REGARDED AS DIFFERENT FISH SHADES.<br><br>13 — NOT MORE THAN ONE LINE / REGARDED AS ONE FISH SHADE   AT LEAST TWO LINES / REGAEDED AS DIFFRENT FISH SHADES |
| Ψ3 (When select 3=n) | WHEN TWO GROUPS OF FISH SHADES ARE SEPARATED BY NOT MORE THAN n LINES THEREBETWEEN, THEY ARE MERGED AND REGARDED TO BE THE SAME FISH SHADE. WHEN THEY ARE SEPARATED BY AT LEAST (n+1) LINES THEREBETWEEN, THEY ARE NOT MERGED AND THEY ARE REGARDED AS DIFFERENT FISH SHADES.<br><br>13 — NOT MORE THAN n LINES / REGARDED AS ONE FISH SHADE   AT LEAST (n+1) LINES / REGARDED AS DIFFERENT FISH SHADES |

FIG. 19

| RULE Ψ4 (select4) | RANGE WHERE FISH SHADES ARE REGARDED AS NOISE AND THEY ARE NOT COUNTED | RANGE WHERE FISH SHADES ARE REGARDED AS FISH SHADES AND THEY ARE COUNTED |
|---|---|---|
| Ψ4 select4 = 1 | NOT MORE THAN ONE PIXEL | OTHER THAN THE CASE DESCRIBED IN THE LEFT SIDE (AT LEAST TWO PIXELS) |
| Ψ4 select4 = 2 | NOT MORE THAN TWO PIXEL IN THE LEFT AND RIGHT OR UP AND DOWN DIRECTIONS | OTHER THAN THE CASE DESCRIBED IN THE LEFT SIDE (AT LEAST TWO PIXELS IN THE DIAGONAL DIRECTION OR AT LEAST THREE PIXELS IN THE UP AND DOWN OR LEFT AND RIGHT DIRECTIONS) |
| Ψ4 select4 = 3 | NOT MORE THAN TWO PIXELS | OTHER THAN THE CASE DESCRIBED IN THE LEFT SIDE (AT LEAST THREE PIXELS) |

THIS SHOWS AN EXAMPLE OF THE CASE WHERE INFORMATION OF ONE SENSOR IS CORRESPONDED TO ONE PIXEL

METHOD AND APPARATUS FOR COUNTING UNDERWATER OBJECTS USING AN ULTRASONIC WAVE

BACKGROUND OF THE INVENTION

The present invention relates to a fish counter for automatically counting the number of fish passing through a fish pass in a fish farming pool, a river, a lake, etc. by utilizing an ultrasonic wave, and relates more particularly to a method for recognizing a fish image.

It is essential to understand the timing of fish going upwards and the number of the fish for the purpose of a proper breeding management of a fish resource. In other words, if the number of fish going upwards is smaller than a scheduled number, it is necessary to increase the number of discharging fries. On the other hand, if the number of fish is more than scheduled, it is necessary to reduce the number of discharging fish so that the number does not exceed a breedable capacity in the upstream.

As a conventional method for counting fish, a visual checking system or a system for counting fish after collecting fish by trapping have been employed ("A Designing of Fish Pass", Hirose et al., Sankaido Shuppan (Japanese). The visual inspection system does not require any special facility and a skilled person can accurately count the number of fish by even discriminating types of fish but there is an increasing error when the number of fish becomes larger. The fish counting system based on fish collection has an advantage in that this system can provide extremely ample data including fish types, fish sizes, fish weights, contents in fish stomachs, etc. but also has a disadvantage of damaging fish body.

Any method according to a labor work requires a continuous work of a skilled person and has a difficulty in performing a long-term continuous counting although a short-term sampling can be achieved by this method. As a result, it has not been possible to obtain seasonal data which are necessary for resource management.

In recent years, a phototube system having a photo-electric tube installed at a partition portion of a fish pass for detecting changes in passage light volume when fish going upwards cross the photo-electric portion and an electric conductivity system for counting passing fish based on a difference of electric conductivity have been partly utilized as an automatic counting system (based on a brochure published by North of Scotland HYDRO ELECTRIC BOARD).

A prior-art publication of the Japanese Patent Unexamined Publication No. JP-A-63-141526 discloses a method for counting fish inside a designated area in stead of counting fish passing a predetermined channel.

The phototube system has a simple device structure but has a problem that a malfunction is very easy to occur due to muddiness and dusts in water. The system according to an electric conductivity can not be applied to the counting of small fish.

SUMMARY OF THE INVENTION

It is a first object of the present invention to provide a method for counting even small fish like fry sweetfish by reducing an error of counting due to muddiness and dusts in water.

It is a second object of the present invention to provide a fish counter which can automatically count fish continuously for a long period without a malfunction due to muddiness and dusts in water.

It is a third object of the present invention to provide a fish counter which can easily estimate the number of fish passing a whole channel by a sensor that covers a part of the fish pass.

It is a fourth object of the present invention to provide a mobile object counting method for accurately counting the number of passing mobile objects.

Other objects of the present invention are made clear by the following description.

The fist object of the present invention can be achieved by a method for counting fish by emitting an ultrasonic wave to a predetermined area where fish pass in a fish farming pool, a lake, or the like (hereinafter to be referred to as a fish pass) and receiving reflected waves from fish bodies, wherein the reflected waves received from the cross section of the fish pass are periodically stored and an ultrasonic wave fish shade image that shows changes of the fish shades is produced and fish are counted by carrying out an image processing for discriminating the ultrasonic wave fish shade image in fish shade units (according to a fish shade decision rule).

The second object of the present invention can be achieved by a unit for counting fish by emitting an ultrasonic wave to a predetermined area where fish pass in a fish farming pool, a lake, or the like (hereinafter to be referred to as a fish pass) and receiving reflected waves from fish bodies, wherein the fish counter includes an ultrasonic wave sensor installed in a depth direction or a width direction of the fish pass cross section, having a plurality of oscillators laid out for transmitting an ultrasonic wave and receiving reflected waves, an ultrasonic wave image producing unit for periodically storing the reflected waves from the ultrasonic wave sensor based on a pixel signal corresponding to the depth direction or the width direction and producing an ultrasonic wave fish shade image for showing a fish shade and changes of the fish shade, a fish shade count image producing unit for taking in one scene for counting from the ultrasonic wave image, producing a fish shade count image of this scene by carrying out an image processing in fish shade unit and counting the fish according to this image, and an output unit for statistically processing a fish number counted by the fish shade count image producing unit and outputting a result.

The third object of the present invention can be achieved by a unit for counting fish by emitting an ultrasonic wave to a predetermined area where fish pass in a fish farming pool, a lake, or the like (hereinafter to be referred to as a fish pass) and receiving reflected waves from fish bodies, wherein the fish counter includes an ultrasonic wave sensor installed in a water depth direction near an exit of one side or both sides of the fish pass cross section, having a plurality of oscillators laid out for transmitting an ultrasonic wave and receiving reflected waves, an ultrasonic wave image producing unit for periodically storing the reflected waves from the ultrasonic wave sensor based on a pixel signal corresponding to the depth direction and producing an ultrasonic wave fish shade image for showing a fish shade and changes of the fish shade passing a detecting area of the sensor at the fish pass cross section, a fish shade count image producing unit for taking in one scene for counting the fish from the ultrasonic wave image, producing a fish shade count image of this scene by carrying out an image processing in fish shade unit and counting the fish in the sensor detecting area, and a fish number correcting unit for storing a fish number correction coefficient of the sensor detecting area to be determined by a relation between a whole-area fish density distribution and a fish number of the fish pass cross section stored in advance based on past actual data and the whole area of the fish pass cross section, correcting the counted fish number in the sensor detecting area by the correction coefficient, and estimating the fish number in the whole area of the fish pass.

The fourth object of the present invention can be achieved by a mobile object counting method for counting a moving number by processing an image signal of mobil objects passing a predetermined area, wherein a line image in a horizontal (vertical) direction for showing the mobile objects in an image signal corresponding to an orthogonal direction of the mobile objects is produced in a predetermined cycle, a predetermined number of stored line images are scrolled in a vertical (horizontal) direction in the predetermined cycle to produce a plane dynamic image including a new line image, a plane image of one scene is taken in from the plane dynamic image each time when the predetermined number of line image is updated, a count image area is set based on a border line signal that is set at a predetermined position excluding at least one line image from a top end downwards of the plane image that has been taken in, a predetermined border line processing is carried out for a pixel signal or a pixel signal group over the predetermined position, and the mobile objects in the count image area are counted.

According to the present invention, a line image for showing a fish shade distribution of a fish pass cross section can be generated in a predetermined cycle in which a received signal of an ultrasonic wave reflected from a fish body is corresponded to a depth (or width) direction of the fish pass. By laying out the line images by a predetermined number by scrolling the line images in a vertical direction in the predetermined cycle, an ultrasonic wave fish shade image of a plane dynamic image for showing changes of a fish shade passing a fish pass within a predetermined time can be produced.

An ultrasonic wave fish shade image includes noises due to a reflection from bubbles and dusts in water and a separation of a fish shade or an integration of fish shades due to these noises. To overcome this difficulty, the ultrasonic wave fish shade image is processed in a count fish shade image of a fish shade unit according to a fish shade decision rule based on the actual. To be more specific, adjacent pixels within a predetermined distance are processed together as the same one fish body and adjacent pixels located in excess of a predetermined distance are separately processed as different fish bodies, and isolated pixels and still image pixel groups of a predetermined pattern are erased as noise.

According to the above method, an image processing which correctly reflects a fish shade can be carried out even if small fish bodies like fries are included, so that an accurate counting of fish can be done.

According to the mobile object counting method of the present invention, a margin area is set in which a mobile body image that lies at a boundary between one scene to be taken in for counting the mobile objects and one scene that has been taken in previously is processed to be included in one of the preceding and the current scenes, and the mobile objects are counted according to the reduced count image area, so that a duplication of mobile objects to be counted is avoided and an accurate counting is made possible.

BRIEF DESCRIPTION OF THE DRAWINGS

FIGS. 16A and 16B are diagrams for explaining the boundary processing which is a first prescription of the fish shade decision rule.

FIG. 17 is a diagram for explaining the merging and separation of left and right sides of the screen which is a second prescription of the fish shade decision rule.

FIG. 18 is a diagram for explaining the merging and separation of up and down sides of the screen which is a third prescription of the fish shade decision rule.

FIG. 19 is a drawing for explaining the erase processing of screen noise which is a fourth prescription of the fish shade decision rule.

DESCRIPTION OF THE PREFERRED EMBODIMENTS

Embodiments of the present invention will be explained below in detail with reference to the drawings.

Figure 1:
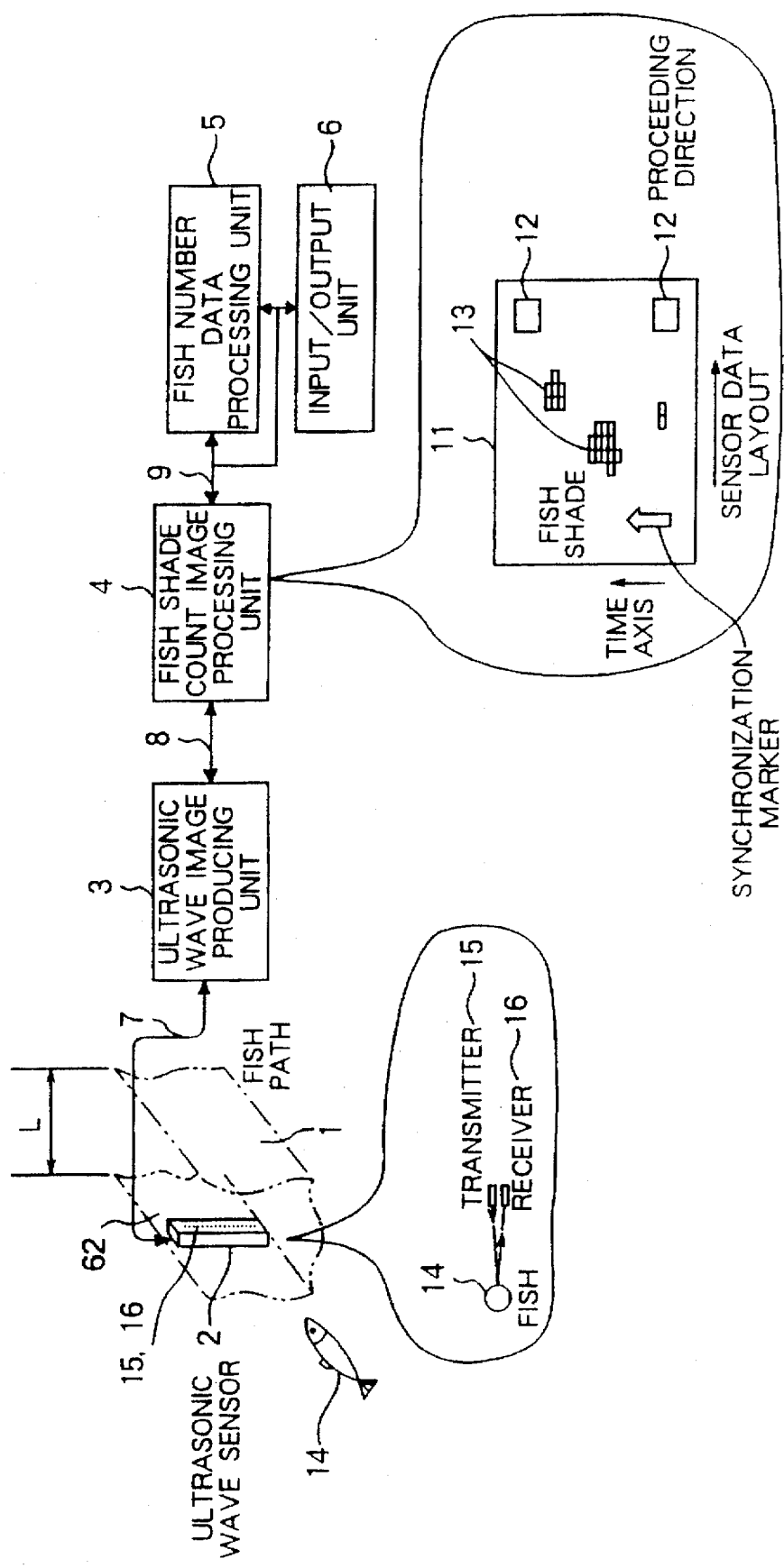
FIG. 1 is a block diagram for showing a whole structure of the fish counter according to one embodiment of the present invention.

FIG. 1 schematically shows the whole structure of a fish counter according to one embodiment and the principle of counting. The fish counter includes an ultrasonic wave sensor 2 disposed in a fish pass 1 for transmitting an ultrasonic wave and receiving reflected waves fish bodies, an ultrasonic wave image producing unit 3 for carrying out a transmission and receiving control of the ultrasonic wave sensor 2 and producing plane image data based on a received signal, a fish shade count image processing unit 4 for counting fish by processing a fish shade image in a countable image, a fish number data processing unit 5 for carrying out a statistical processing based on a counted fish number, and an output unit 6 having a display unit and the like for displaying a fish shade image, a fish shade count image or statistical data. A reference numeral 11 designates a scene, 12 a synchronization marker, 13 a fish shade, 14 a fish, 15 a transmitter, 16 a receiver, 62 a fish pass wall portion, and 7, 8 and 9 output lines.

A fish pass is generally structured by separating a river water run, where fish are going from the downstream to the upstream, with a plurality of partitions to allocate a total dynamic head to each partition so that the fish can easily run upwards. When each fish passes by a partition, the fish can energetically pass the exit by working against the fast water flow. The fish pass 1 in the present embodiment is formed naturally when water is running at a speed which stops fish staying at one place.

Figure 2:
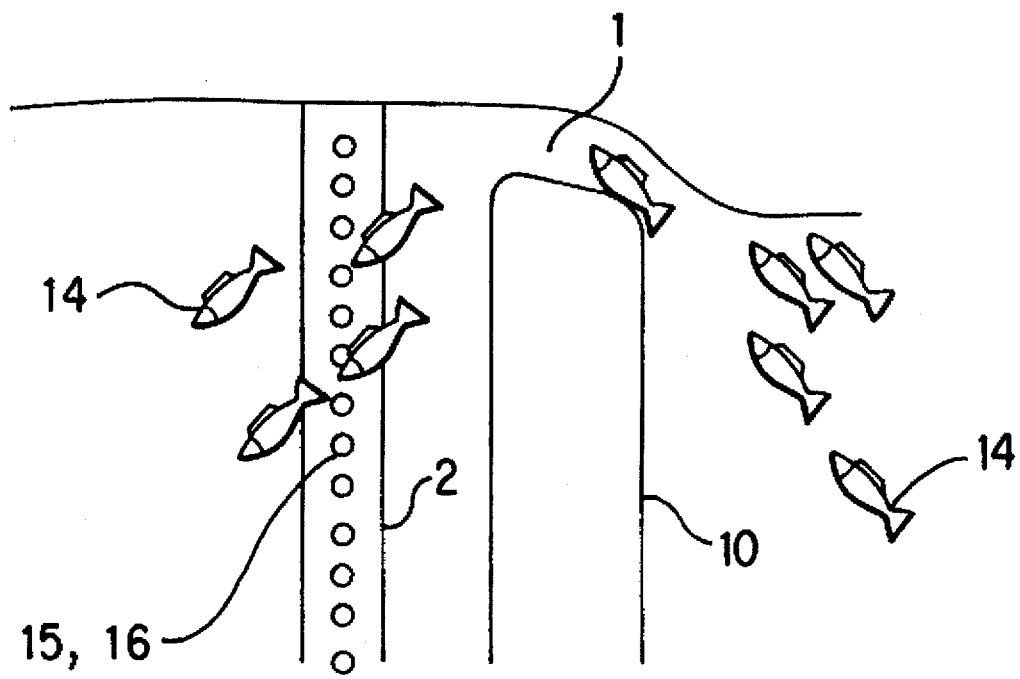
FIG. 2 is a schematic perspective view for showing the layout of the fish pass and the ultrasonic wave sensor.

FIG. 2 shows a layout status of the sensor 2 and a partition 10 in the fish pass 1. The ultrasonic wave sensor 2 is installed at one side or both sides near the exit of the partition of the fish pass 1. The sensor 2 is structured by laying out in an array shape multiple sets of ultrasonic wave transmitters 15 and ultrasonic wave receivers 16 (transmitters and receivers may be shared) in 5 to 7 mm intervals and is disposed in a depth direction of the fish pass 1. An ultrasonic wave is emitted from each transmitter 15 at every 1 to 10 second interval in a width direction of the fish pass.

With the above-described arrangement, fish passing the fish pass cross section, for example, fish bodies of the sizes of fry sweetfish, running at the speed up to a maximum 2 m per second can be detected. A sensor detecting distance is about 350 mm for a fish pass width L of about 1 to 3 m. However, a greater part (at least 95%) of fries have a habit of going upwards near the partition at which a water flow rate is smaller. Therefore, there is no practical problem if the sensor 2 is provided on both sides of the fish pass. The sensor 2 may be disposed not in a depth direction but in a width direction of the fish pass from both sides of the partitions, or may be in a combination of a depth direction and a width direction.

Figure 3A:
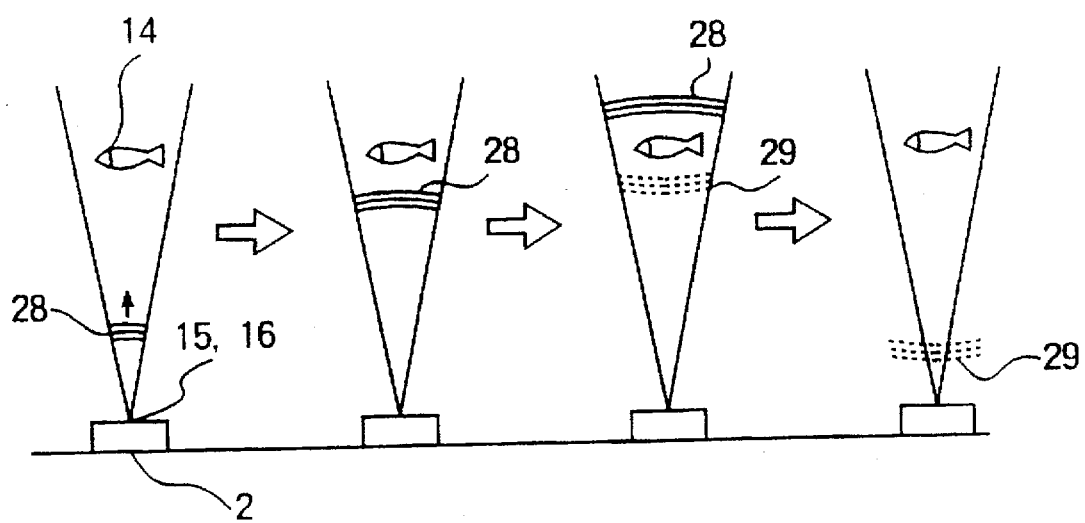
FIGS. 3A and 3B are diagrams for explaining the principle of detecting fish bodies by the ultrasonic wave sensor.
Figure 3B:
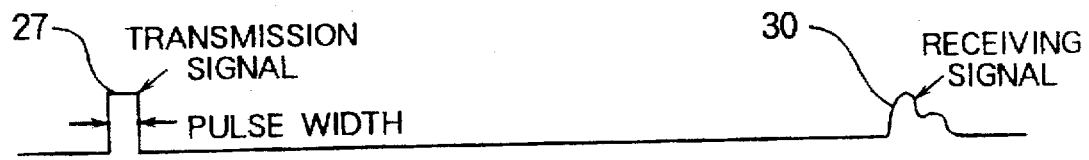

FIGS. 3A and 3B show a principle of detecting fish bodies by the ultrasonic wave sensor 2. As shown in FIG. 3A, an ultrasonic wave 28 transmitted from the transmitter 15 is reflected by a fish 14 which is passing right in front of the transmitter. A reflected wave 29 of this ultrasonic wave is detected by the ultrasonic wave receiver 16. FIG. 3B shows a signal wave form of the wave to be transmitted and received by the sensor 2. The transmitter 15 is excited by a transmission pulse 27 from the ultrasonic wave image producing unit 3 and the ultrasonic wave 28 is emitted. In the mean time, the receiver 16 is excited by the reflected wave 29 and a receiving signal 30 is outputted.

Figure 4:
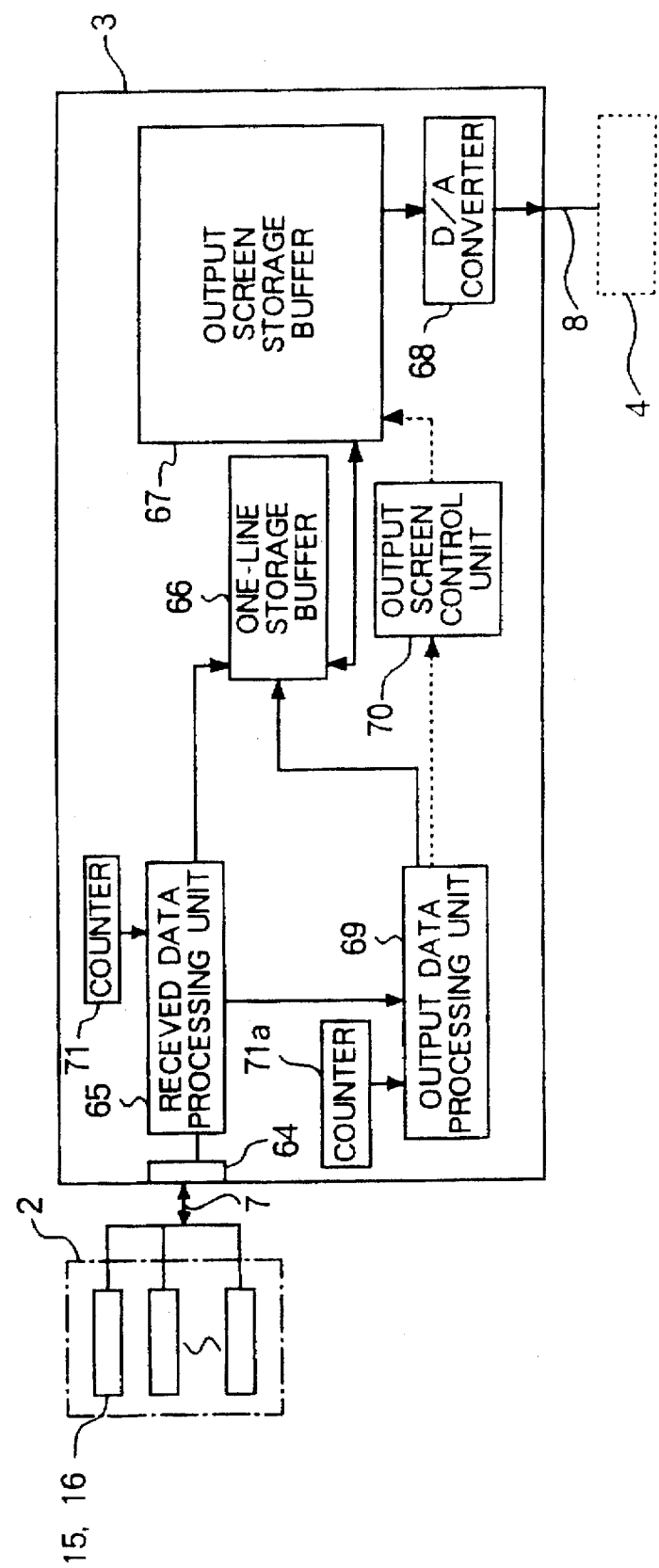
FIG. 4 is a block diagram for showing the details of the ultrasonic wave image producing unit according to the same embodiment.

FIG. 4 shows a structure of the ultrasonic wave image producing unit 3. A transmission and receiving signal processing unit 64 applies the high frequency transmission pulse 27 to the sensor 2 at every 1 to 10 milli-second, and in the mean time, receives the receiving signal 30 by A/D converting this signal. A received data processing unit 65 counts a received signal for each receiving portion of the sensor 2 and stores the result in a one-line buffer 66 that has a memory area for each receiving portion.

The received data processing portion 65 counts up the number of detecting received signals for each area until a counter 71 for counting the number of outputting the transmission pulse 27 exceeds a predetermined number. In the present embodiment, a detection of fish bodies passing the cross section of the fish pass is ensured by emitting an ultrasonic wave four times. As a result, depending on the number of signal receiving, a numerical value of 0, 1, 2, etc. is stored in each area of the buffer 66.

Figure 5:
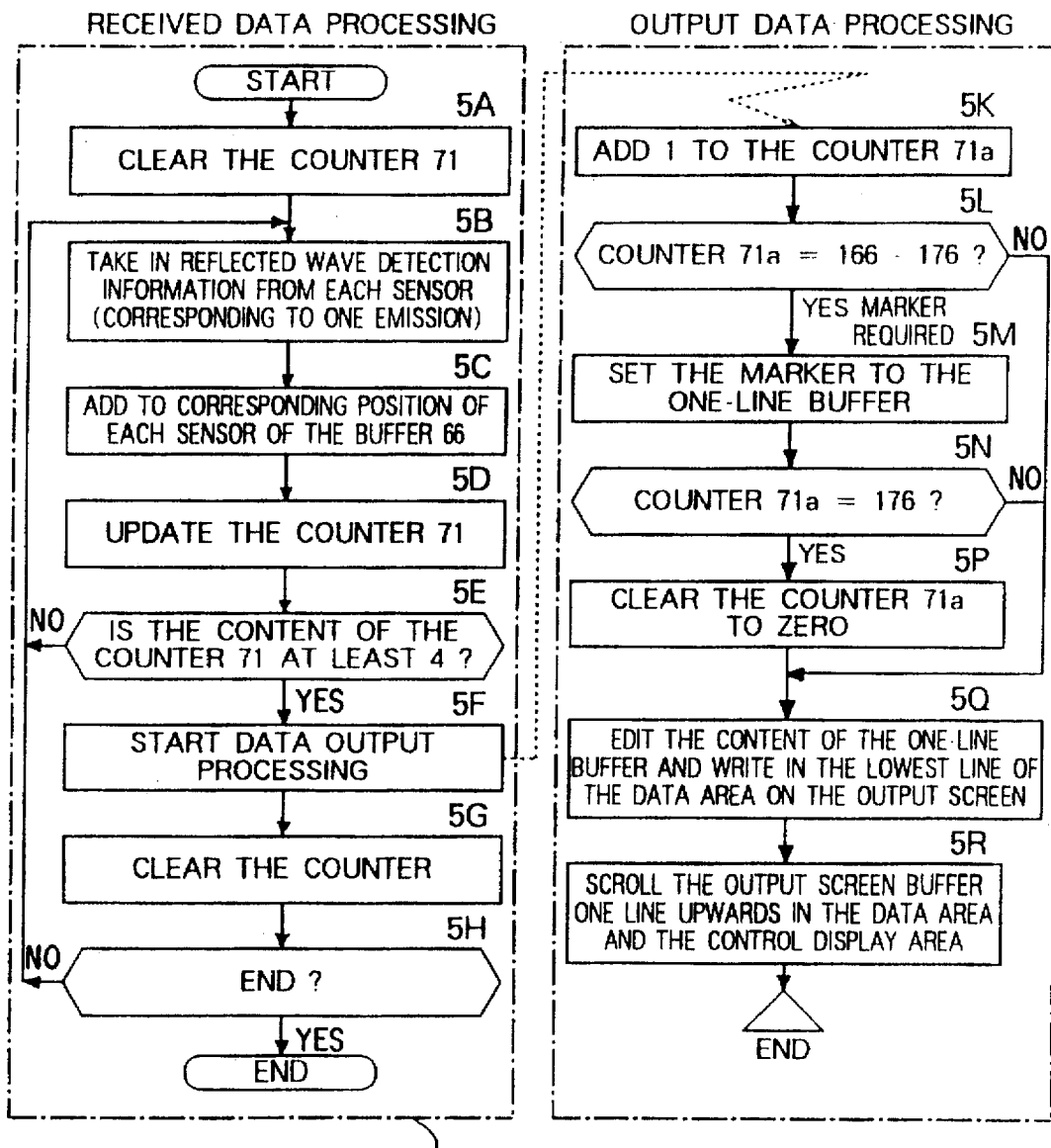
FIG. 5 is a flow chart for showing the processing procedure of the ultrasonic wave image producing unit.

The contents of the one-line buffer 66 show a line image of a fish shade of the fish passing the cross section of the fish pass (orthogonal with the water flow) that has been received by each receiving portion of the sensor 2 at almost the same time. The contents of the buffer 66 are updated at every 1–60 second cycle. The processing procedure of the above received data will be explained by a flow shown in FIG. 5 (steps 5A to 5H). At first, the counter 71 is cleared (step 5A). Next, reflected wave detection information from each sensor is taken in (for one emission portion) (step 5B). Next, the information is added to a corresponding portion of each sensor of the buffer 66 (step 5C). Next, 1 is added to the counter 71 (step 5D). When the number of repetition is less than 4 (that is, when the value of the counter 71 is less than 4), the processing is repeated from the processing of the step 5B (step 5E). When the number of the repetition is at least 4, the data output processing is started (step 5F). Next, the counter 71 is cleared to zero (step 5G) and if the processing is not an end, the processing returns to the step 5B. The above processing is repeated (step 5H).

The output data processing portion 69 which is started at every 1–60 second from the starting of the detection adds a marker at every predetermined interval, transfers the contents of the one-line buffer 66 to the bottom line of the output screen memory buffer 67 and scrolls the whole of the output screen buffer upwards by one line. A detailed procedure will be explained below with reference to FIG. 5 (steps 5K to 5R). At first, 1 is added to the counter 71a (this counter is in a zero cleared state at the time when the system is started) (step 5K). Next, when the value of the counter 71a is between 166 and 176, it is necessary to produce a marker, and the process goes to the processing of a marker production (step 5L). If it is not necessary to produce a marker 8 (that is, when the value of the counter 71a is not than 165), the process goes to the end of the processing. When it is necessary to produce a marker (that is, when 166≦ the counter 71a≦176), the processing in the step 5M afterward is carried out. To be more specific, a marker is set to the one-line buffer (step 5M). Next, when the value of the counter 71a is just 176 (step 5N), the counter 71a is cleared to zero (step 5P). When the value of the counter does not coincide with 176, the process goes to the processing in step 5Q (step 5N). After the marker processing has been finished, the contents of the one-line buffer are transferred to the bottom line of the data area on the output screen (step 5Q). Next, the output screen buffer (that is, the data area and the control display area) is scrolled upwards by one line (step 5R).

Writing to the buffer 67 is carried out by editing the contents of the buffer 66. In other words, if there has been at least one time as the number of receiving of a signal for each area of the buffer 66, 1 is written and if there has been no receiving of a signal, 0 is written. The line area of the buffer 67 has a storage area corresponding to the pixel of the display screen (not necessarily one to one), and one signal at one receiving portion is corresponded to be displayed by one or a plurality of pixels on the screen. For example, when the sensor 2 has 128 receiving portions laid out and the number of pixels per one line of the buffer 67 is 512, one receiving signal is displayed by two or three pixels.

A receiving signal from the ultrasonic wave sensor 2 can also be displayed by a shaded image by corresponding the number of receiving signals to be stored in each area of the buffer 66 to the luminance of pixels to be displayed, in stead of a binary image of 0 or 1 as described above.

In the manner as described above, plane image data of one scene structured by 192 lines, for example, is produced in about three seconds and a dynamic image to be updated by one line at every 1/60 second can be obtained. This plane image data is converted into a video image through a D/A converter 68 and this image can be displayed on the CRT screen. This output image (an ultrasonic wave image) shows changes at every 1/60 second of fish shades of fish passing the cross section of the fish pass orthogonal with the flow of the fish pass 1.

Figure 6:
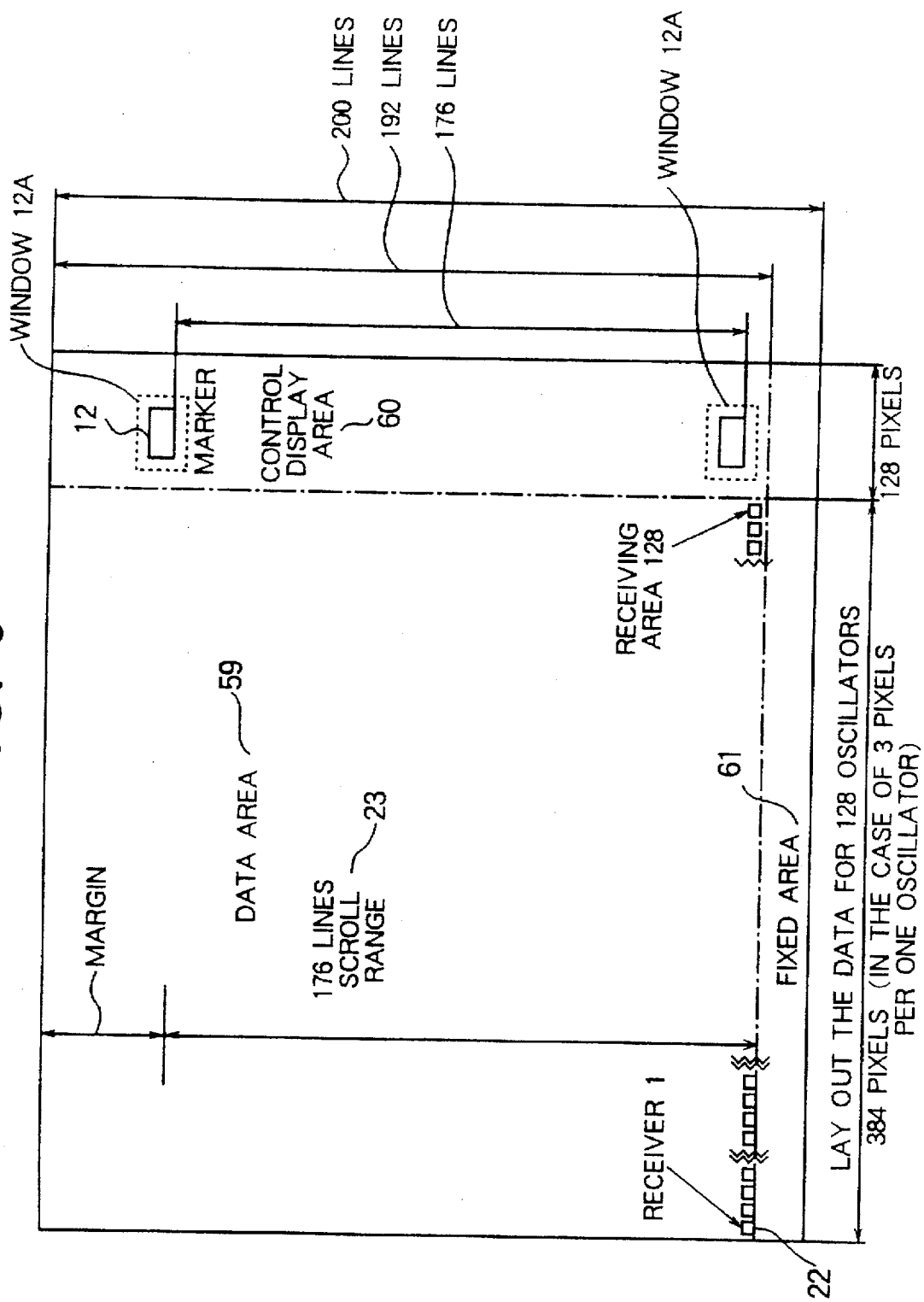
FIG. 6 is a diagram for explaining the structure of the memory buffer of the ultrasonic wave output screen.

FIG. 6 is a schematic diagram for explaining the structure of the output image storage buffer 67. The buffer 67 is structured by a data area 59 of 384 pixels×192 lines, a control display area 60 of 128 pixels×192 lines, and a fixed area 61 of 8 lines for showing the correspondence between the receiving portion and the pixel data, and the like (in the present embodiment it is assumed that one signal receiving is displayed by three pixels).

The data area 59 is an ultrasonic wave image area in which the receiving information from the ultra-sonic wave sensor 2 has been edited and recorded. In the one-line storage area, received data obtained at almost the same time (within 4 to 40 ms in the present example) are laid out from the left to the right in the layout sequence of the ultrasonic wave receivers.

As described above, information received by one sensor is usually displayed by a plurality of pixels, and for the purpose of explanation, it will hereinafter be assumed that information received by one sensor is displayed by one pixel.

The control display area 60 is utilized for obtaining synchronous information from a dynamic image by the fish shade count image processing unit 4 in order to take in one scene which is necessary for counting. A marker 12 of the control display area 60 is display controlled so as to be moved in synchronism with the line of the data area 59 scrolled upwards by one line at every 1/60 second.

The marker 12 appears from the lower end of the control display area 60 at every 176 lines and disappears together with the data portion at the upper end of the control display area 60. Accordingly, the marker 12 appears in the cycle of 176 lines for the whole 192 lines of the control display area, so that one or two markers exist in the same scene. This marker is used to determine an image to be processed when an image of a fish shade scene is analyzed to count the fish shade. The maker is to be monitored at all times and when the marker has come to a specific position, an image is to be taken in. In order to monitor that the marker has come to a constant position, a window 12A slightly than the marker is set at the position where the marker appears in the image processing unit and an image is taken in. By suitably processing an input image, a decision is made whether the marker has appeared within the window 12A so that the marker can be detected easily. The window 12A can be set at any constant position where the marker appears.

Referring to an expression 1, a difference $\Delta L$ (16) between a line number L1 (192) of the data area and a line number L2 (176) of a section where the marker 12 appears is an important margin for counting the number of fish shades in the moving screen without duplicating the number. As described later, the screen area for counting the fish number has 176 lines, and by using the 16 lines of the margin a duplication of the pixels or pixel group signals that lie in the border with the preceding screen are eliminated.

$$\Delta L = L1 - L2 \tag{1}$$

The ultrasonic wave image produced by the fish shade image producing unit 3 is produced by corresponding the received signal of the ultrasonic wave sensor 2 to the pixel or the pixel group of the output image storage buffer 67, and this ultrasonic wave image itself does not correctly reflect the fish shade and requires a correction of the image. As an assumption for explaining the above, the principle for producing fish shade data according to an ultrasonic wave will be explained.

Figure 7A:
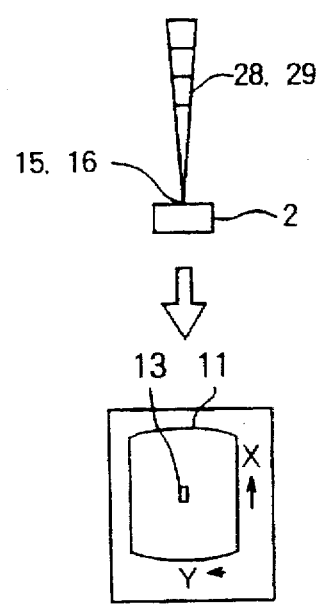
FIGS. 7A, 7B and 7C are diagrams for explaining time changes of a fish shade display by the ultrasonic wave sensor.
Figure 7B:
Figure 7C:

FIGS. 7A. 7B and 7C show how a fish shade 13 is displayed on the output screen 11 at times T1, T2 and T3 when a fish 14 passes in front of the ultrasonic wave sensor 15 (16). On the screen 11, each image is displayed by rotating the image by 90° to match the image with the spatial positional relation of the fish. An arrow in FIG. 7C corresponds with a moving direction of the fish.

At the time T1, an ultrasonic wave is reflected at the front portion of the fish and is detected by the sensor and the fish shade 13 appears on the screen as shown in the drawing. At the time T2, the ultrasonic wave is reflected by the center portion of the fish and the fish shade 13 is further added. At the last time T3, the ultrasonic wave is reflected by the latter portion of the fish and the fish shade 13 is added as a third line. In actual practice, the shape of the fish shade 13 is determined based on the conditions such as the sizes of the fish and running speed of the fish, etc.

FIGS. 8A, 8B, 8C and 8D show features of the fish shade image obtained from the ultrasonic wave sensor according to sizes and speed of fish and distance between fish.

Figure 8A:
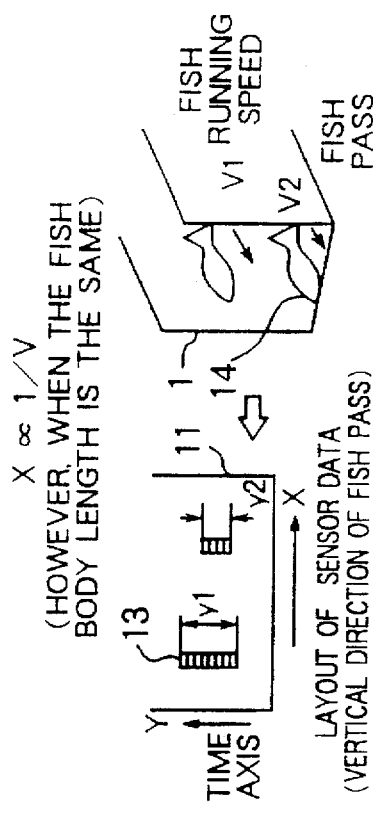
FIGS. 8A, 8B, 8C and 8D are diagrams for showing the relationship between a fish shade width and a fish body height, a relationship between a fish shade height and a fish running speed, a relationship between a fish shade height and a fish body length and a relationship between a distance between fish and a fish shade, respectively.

FIG. 8A shows that a fish height H is almost proportional to a horizontal width x of the fish shade 13 in the sensor data because the sensor is laid out in a vertical direction with respect to the side wall of the fish pass. In other words, the number of pixels within one line is almost proportional to the size of the fish body height.

Figure 8B:
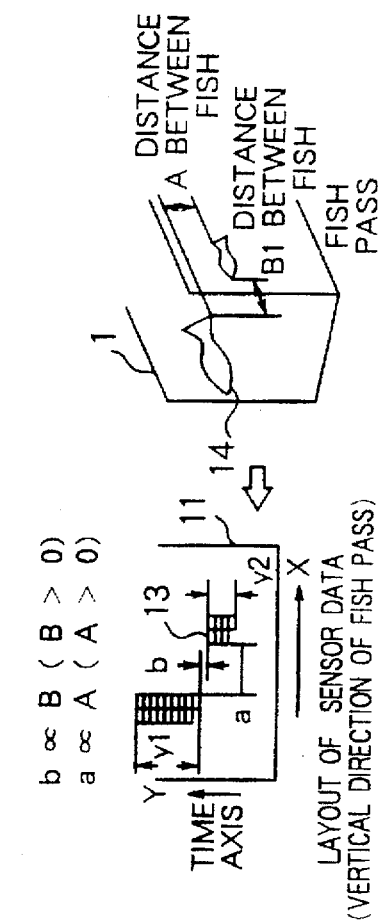
Figure 8C:
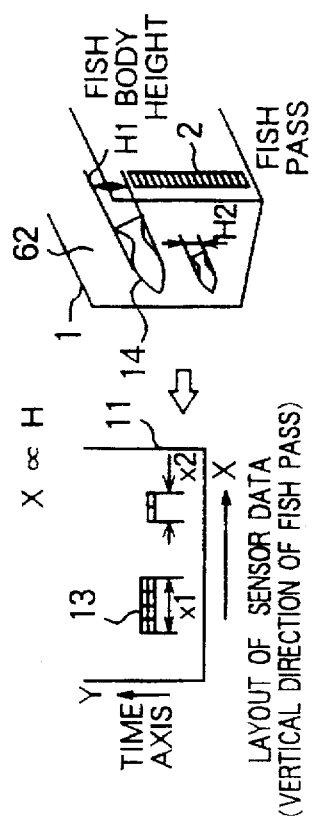

FIG. 8B shows that a fish running speed V is almost proportional to a height y of the fish shade 13 when the fish body length is the same. As shown in FIG. 8C, when the fish running speed V is the same, the fish body length L is almost inversely proportional to the height y of the fish shade 13.

Figure 8D:
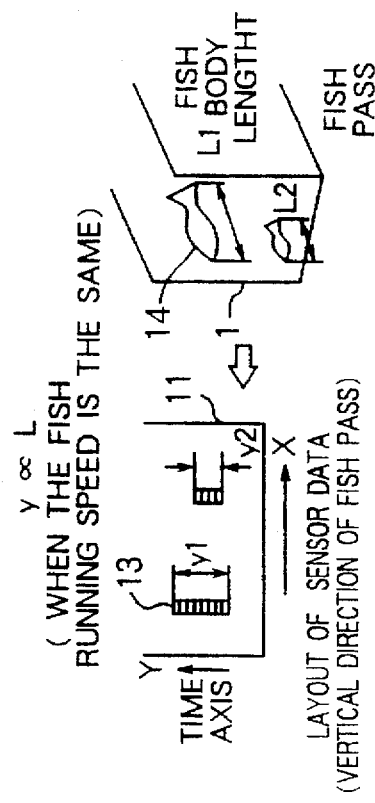

FIG. 8D shows that when there is a sufficient distance L between fish, distances between fish A and B are almost proportional to distances between fish shades a and b.

Figure 9B:
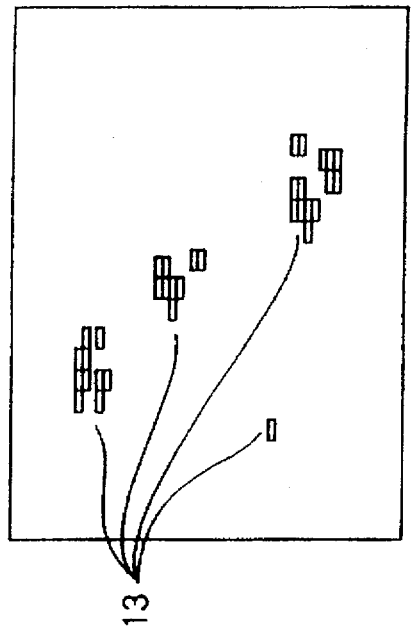
FIGS. 9A, 9B, 9C and 9D are diagrams for explaining the shape features of fish shades respectively.
Figure 9D:
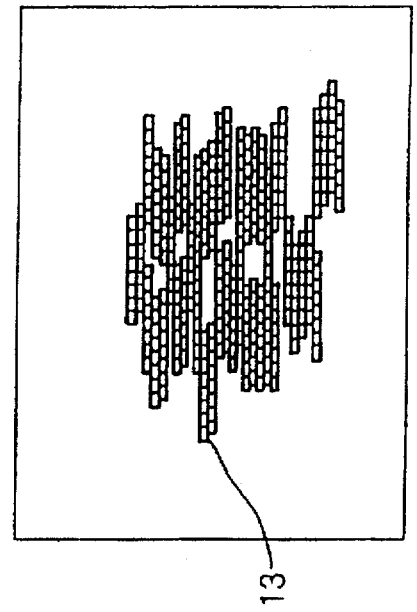
Figure 9A:
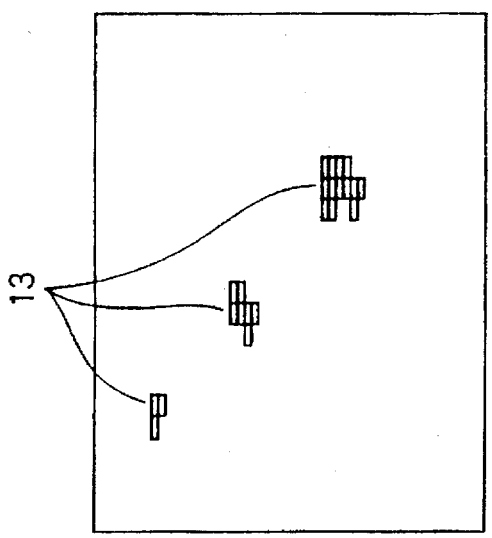

FIGS. 9A, 9B, 9C and 9D show shape features of a fish shade. FIG. 9A shows an image of fish shades when small fish pass with distance from each other, and this is a most ideal example. The number of fish can be counted as three from the number of the fish shades 13.

FIG. 9B shows a most typical image in normal days, with pixels for forming one fish shade being displayed separately or noise being mixed into the pixels, although the fish running conditions are the same as those shown in FIG. 9A. Under this display conditions, the fish number is counted as nine.

Figure 9C:
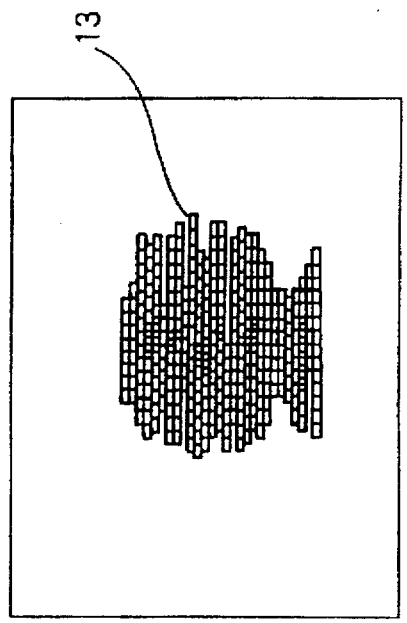

FIG. 9C shows an image of a typical fish shade shape of one large shape fish and FIG. 9D shows an image of a fish shade of a group of small shape fish. In the former case, the fish shade can be judged to show a fish shade of one fish based on the features of the external shape pattern. In the latter case, an external shape can not be specified but the fish shade has features that the area of the pixel group is large and there are a plurality of holes within the shape. In the latter case, the number of fish is estimated by comparing a result of an image analysis according to an experiment (an area of a pixel group) with a true value of the number of fish according to a visual inspection.

By utilizing the features of the fish shade image, the fish shade count image processing unit 4 analyzes the image of the fish shade so that the number of passing fish can be counted correctly.

The fish shade images explained in the above are based on an example of producing the fish shade images by utilizing a receiving signal of the ultrasonic wave sensor. However, the production of a fish shade image is not limited to this method and a fish shade image can also be produced by using a sensor which transmits and receives γ rays, infrared rays, visual rays, etc.

Figure 10:
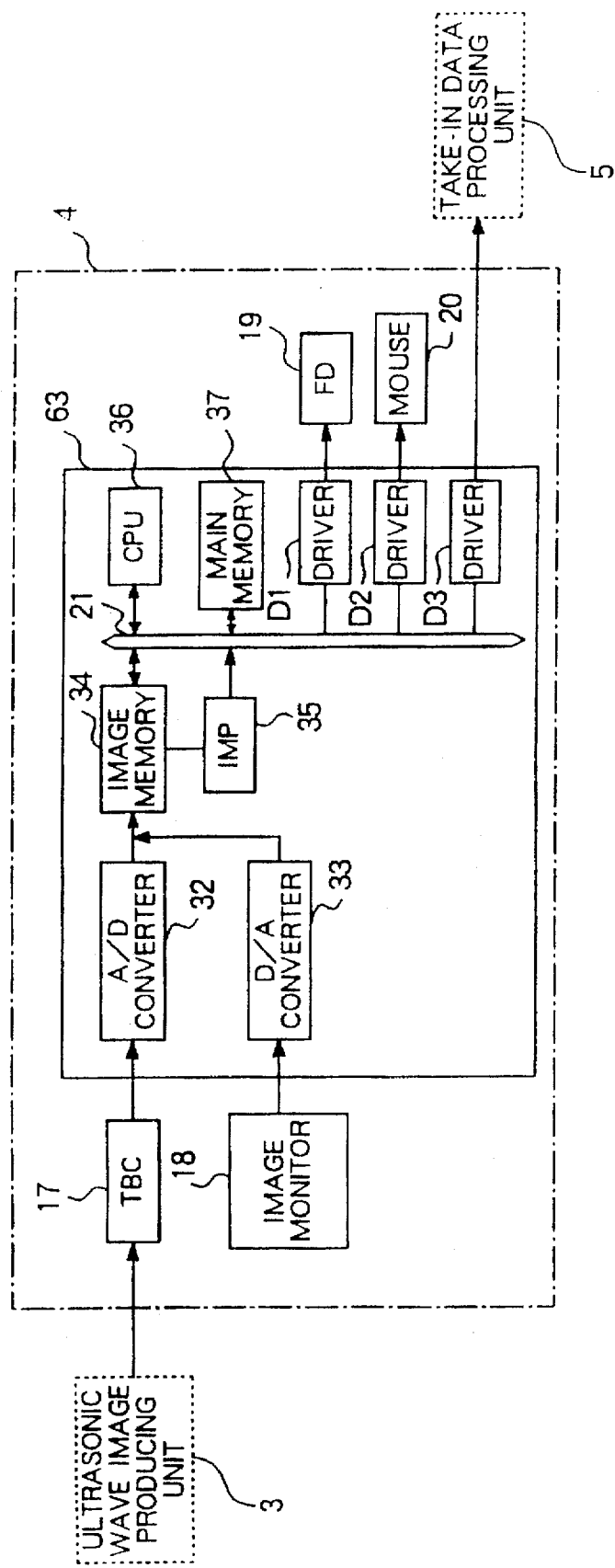
FIG. 10 is a drawing for showing the structure of the fish count image processing unit.

FIG. 10 shows a hardware structure of the fish shade count image processing unit 4, which is structured by an image processing unit main body 63, a time base collector 17, an image monitor TV 18, a floppy disk 19, a mouse 20, etc. The image processing unit main body 63 includes a CPU 36, an image memory 34, an image processing exclusive processor IMP 35, etc. 32 and 33 designate an A/D converter and a D/A converter respectively, and 37 designate a main memory. D1 to D3 designate drivers.

Figure 11:
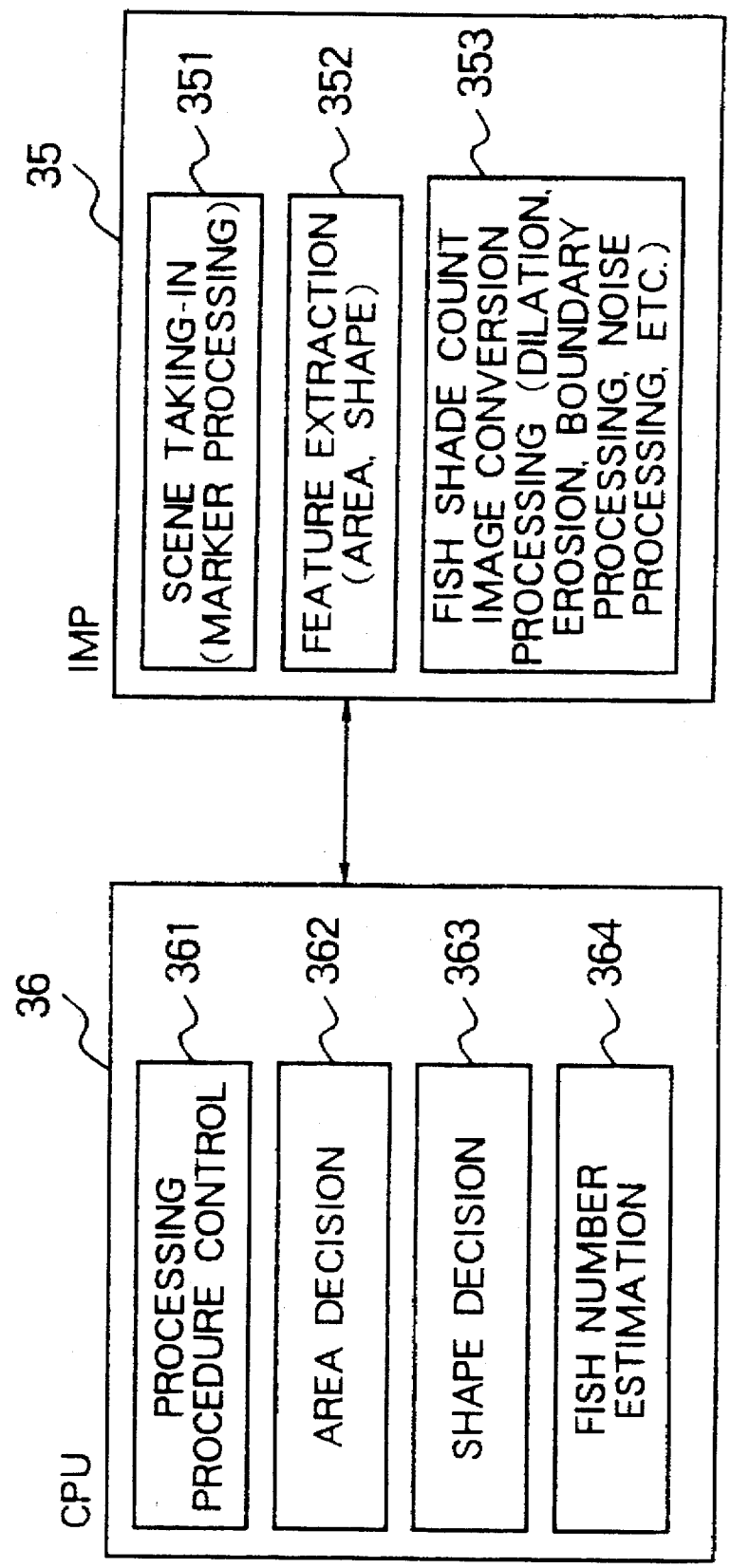
FIG. 11 is a functional block diagram for explaining the functions of the CPU and the IMP of the fish shade count image processing unit.

FIG. 11 shows a functional structure of the CPU 36 and the IMP 35 which are the central portions of the fish shade count image processing unit. The CPU 36 includes a processing procedure control unit 361 of the image processing unit main body 63, an area decision unit 362, a shape decision unit 363 and fish number estimating unit 364. The IMP 35 includes an image take-in processing unit 351, a feature extraction unit 352 for calculating the area and shape of an image, and a fish shade count image conversion processing unit 353 according to the decision rule. The CPU 36 controls the operation of each function of the IMP 35 and carries out a decision of an area, a decision of a shape and a decision of a fish number based on the result of the control.

Figure 12:
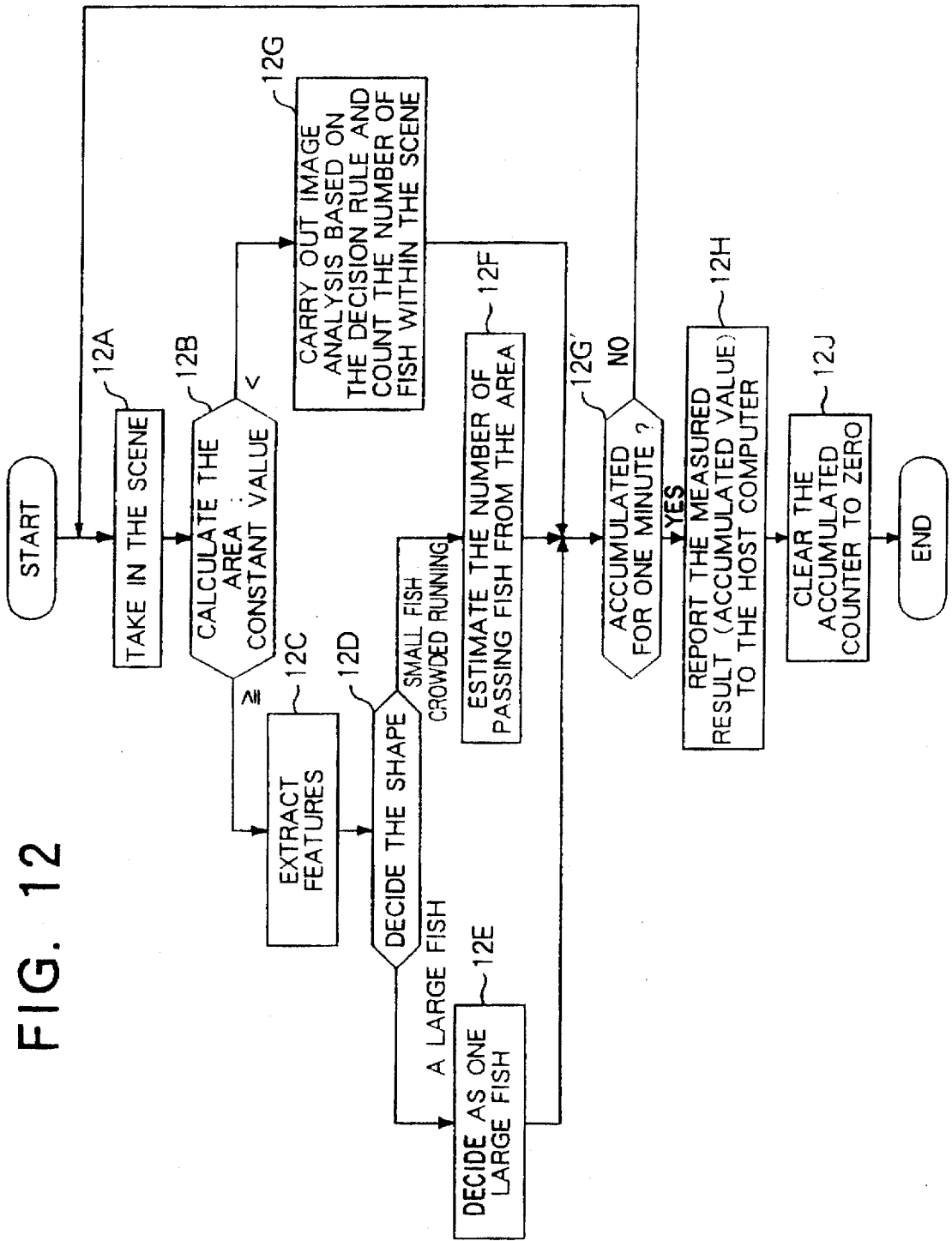
FIG. 12 is a flow chart for showing the outline of the processing of the fish shade count image processing unit.

FIG. 12 is a flow chart for showing the outline of the procedure of counting the number of passing fish according to the image processor, the IMP 35 and the CPU 36. At step 12A, image data of one scene to be counted is taken in, together with a margin area position (or a timing), from an ultrasonic wave image to be updated in 1/60 cycle from the ultrasonic wave image producing unit 3.

At step 12B, areas of individual images shown by a pixel signal or a mass of element signals within one scene are calculated, and a decision is made whether a value obtained is at least a predetermined constant value or not. If the value is at least the predetermined constant value, features (for example, a vertical to horizontal ratio, shape coefficients (area, a circumferential length), number of holes (number of a plurality of holes inside the whole image in FIG. 9D), total area of the hole, etc.) are extracted at step 12C, and a shape decision is made based on the result of this extraction (step 12D). If a decision has been made that the fish shade shows a large fish, the number of fish is estimated to be one large shape fish (step 12E). If a decision has been made that the fish shade shows a crowded passing of small fish, past actual values are referred to at step 12F, and the number of fish is estimated from the area value calculated at the step 12B.

On the other hand, if the area is not larger than the predetermined constant value at the step 12B, an image analysis and a conversion processing are carried out based on the fish shade decision rule at step 12G, and the number of fish is counted based on the converted count image. The counted or estimated number of fish is reported to the data processing unit 5 at every one minute (steps 12G to 12J). FIG. 12 shows an example of an accumulation of this processing for one minute, and this processing is repeated in actual practice.

Figure 13:
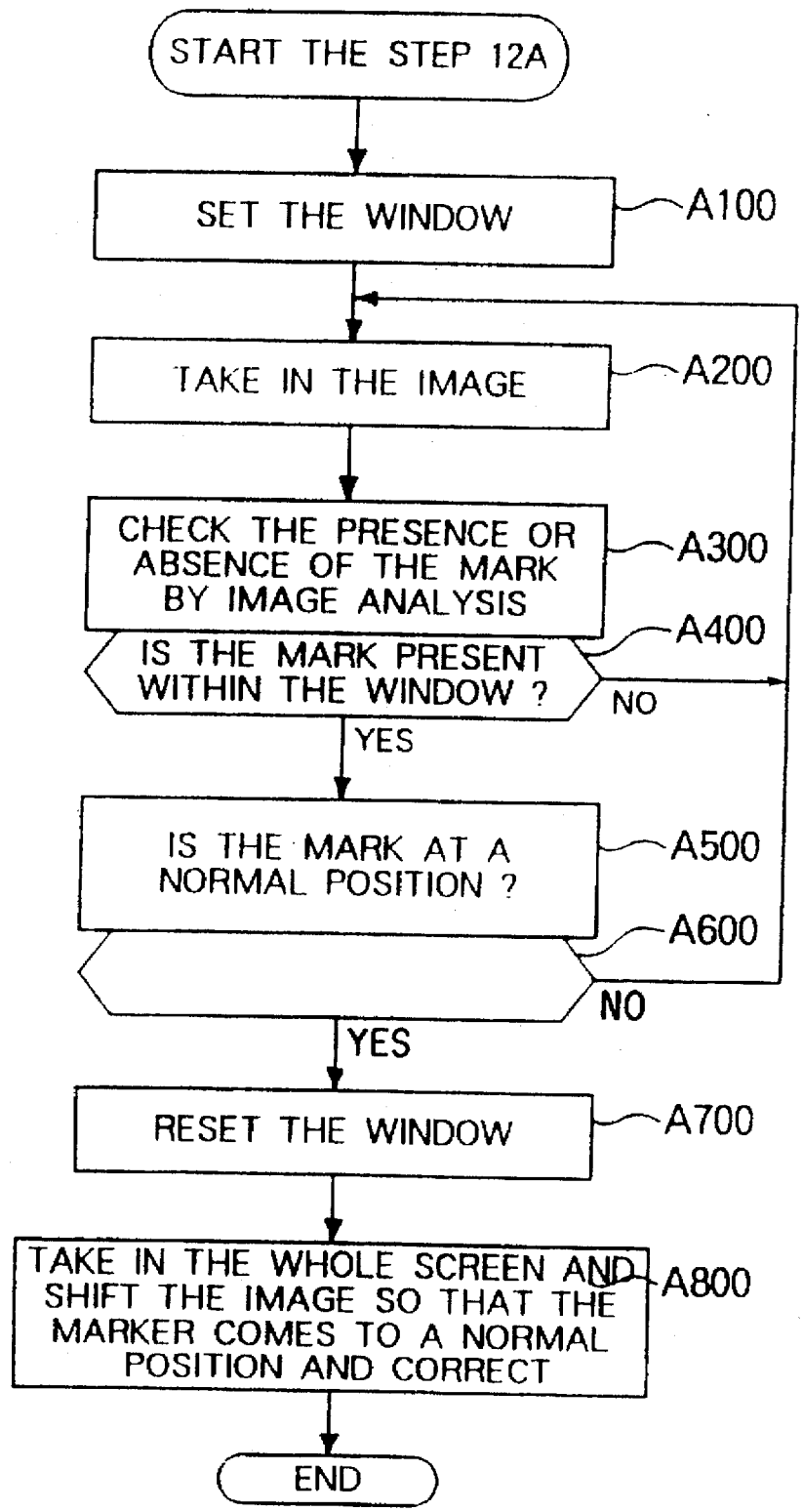
FIG. 13 is a flow chart for explaining the screen take-in processing.

FIG. 13 shows a flow chart of the processing procedure of taking in one scene at the step 12A. When image data is to be taken in from an image signal of the output screen storage buffer 67 of the fish shade image producing unit 3, the image data is taken in by setting a window 12A to the control display area 60 (step A100). An image taking-in operation is started (step A200), and the taken-in image inside the window is analyzed and the image is checked to see whether there is the marker 12 in the image (step A300). The take-in operation is continued until the marker appears (step A400). When the marker has appeared, it is checked whether the marker is placed at a proper position or not (step A500). When the marker has come to a proper position, the window is reset (step A700) and the take-in image position of the whole screen is corrected (step A800).

Figure 14:
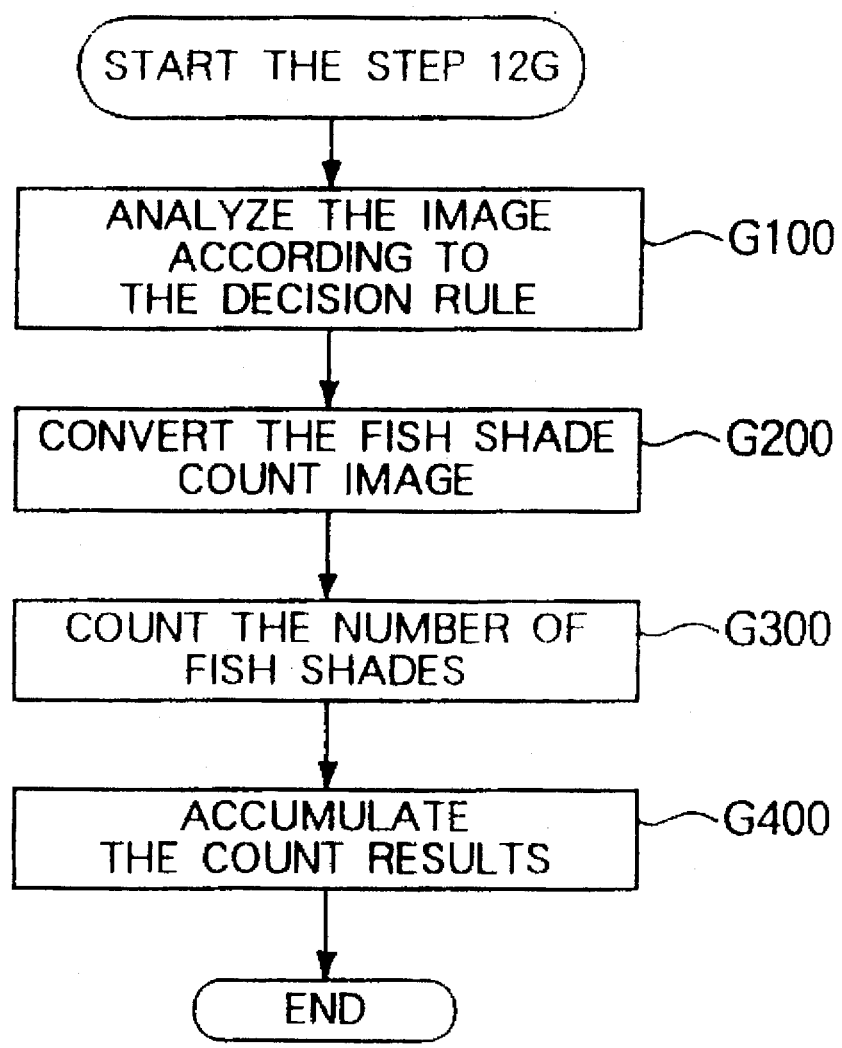
FIG. 14 is a flow chart for explaining the processing of the outline according to the fish shade decision rule.

FIG. 14 shows the outline processing procedure of the step 12G. An image analysis is carried out according to the fish shade decision rule to be described later (step G100). A dilation/erosion processing, a border processing, etc. are carried out based on the result of the image analysis, and a count fish shade image of fish shade unit is produced (step G200). A label is provided to each fish shade to count the number of fish on the count fish image (step G300), and counted value is accumulated to the preceding value (step G400).

The fish shade decision rule for deciding the fish shade by the image processor IMP 35 will be explained in detail with reference to FIGS. 15 to 20.

Figure 15:
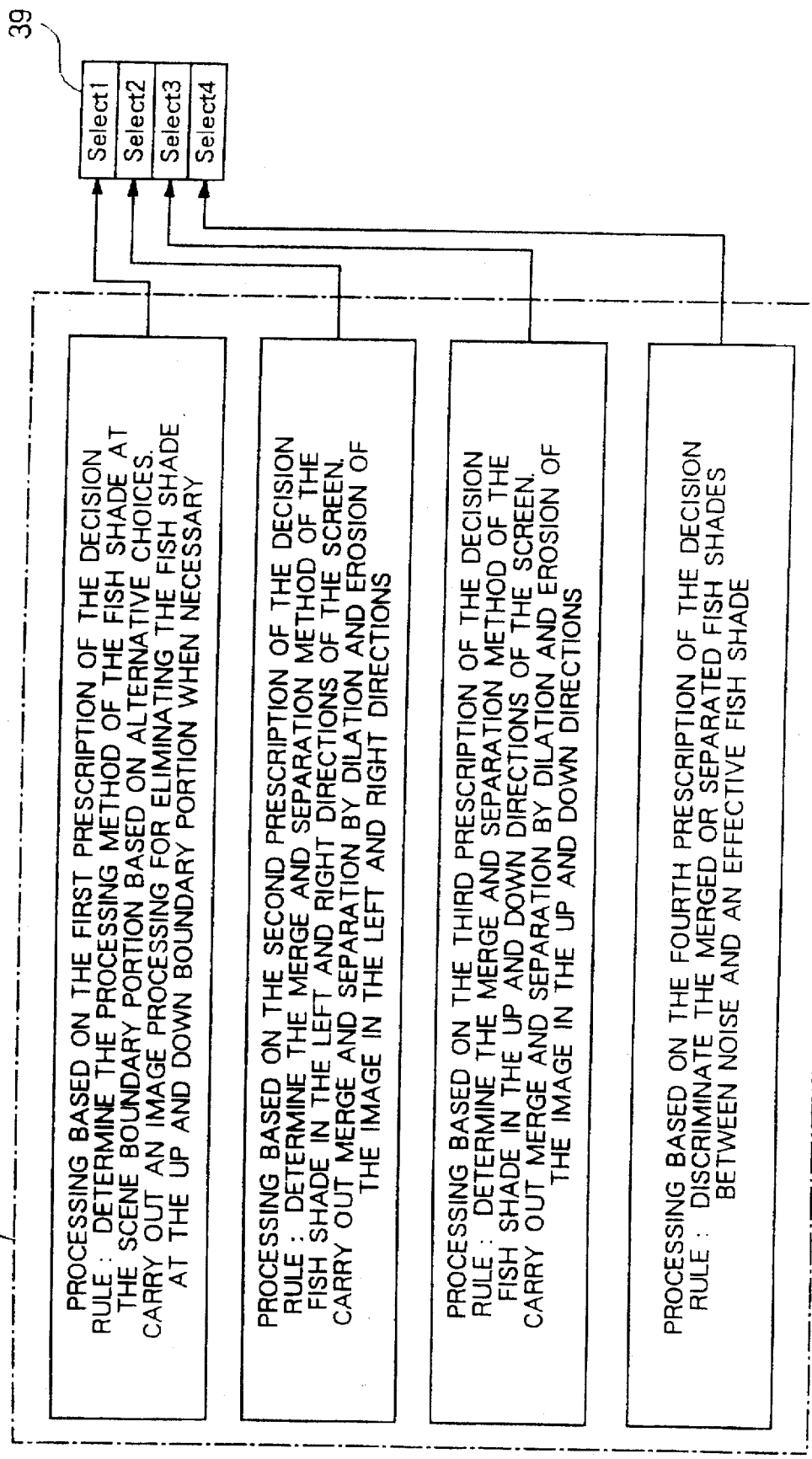
FIG. 15 is a diagram for explaining the outline of the fish shade decision rule.

FIG. 15 shows the outline of the rule stored in the decision rule storage area 38 of the main memory 37 and the like. The decision rule of the present embodiment is structured by four parts. One part is for providing a system for processing a fish shade at an adjacent scenery boundary, and is called a first prescription of the decision rule. A second part is for providing a processing method relating to a merging and a separation of the fish shades 13 that lie in the left and right directions of the screen, and is called a second prescription of the decision rule. A third one is for providing a processing method relating to a merging and a separation of the fish shades 13 that lie in the up and down directions of the screen, and is called a third prescription of the decision rule. A last one is for providing a decision of whether a merged or a separated independent fish shade is a noise or an effective fish shade, and is called a fourth prescription of the decision rule.

In the decision rule, selection conditions are provided in each of select 1 to select 4 in the reference numeral 39, such as Ψ1 to Ψ3, and these selection conditions are structured so that they can be suitably selected to match various conditions such as a fish pass, a type of fish, a season, etc.

An embodiment of the first prescription of the decision rule will be explained with reference to FIGS. 16A and 16B. As shown in FIG. 16A, an output image from the fish shade image producing unit 3 is processed by being divided into a scene 11, and accordingly it becomes necessary to carry out a boundary processing of the fish shade that lies at the boundary between the scenes. In the present example, three ways of selection are set, as shown in FIG. 16B; a boundary based on the decision rule (a first selection Select 1=1) is included in the upper side scene, a boundary based on the decision rule (a second selection Select 1=2) is included in the lower side scene, and a boundary based on the decision rule (a third selection Select 1=3) is disregarded.

A fish shade b is included in a scene S1 according to the rule (the first selection), included in a scene S2 according to the rule (the second selection) and is not included in either of the S1 and S2 according the rule (the third selection). A fish shade d is included in the scene S2 according to the rule (the first selection), included in the scene S3 according to the rule (the second selection) and is not included in either of the S2 and S3 according to the rule (the third selection). Explanation of the symbols in the drawing:

| | |
|---|---|
| S1 | a first scene |
| S2 | a second scene |
| S3 | a third scene |
| S4 | a fourth scene |
| a | a fish shade in the scene S1 |
| b | a fish shade on the boundary between the scene S1 and the scene S2 |
| c | a fish shade in the scene S2 |
| d | a fish shade on the boundary between the scene S2 and the scene S3 |
| e | a fish shade in the scene S3 |
| f | a fish shade on the boundary between the scene S3 and the scene S4 |
| g | a fish shade in the scene S4 |
| M1 | a marker for showing the boundary between the scene 1 and the scene 2 |
| M2 | a marker for showing the boundary between the scene 2 and the scene 3 |
| M1 | a marker for showing the boundary between the scene 3 and the scene 4 |

FIG. 17 shows an embodiment of the second prescription of the decision rule. According to this rule, when the fish shades 13 lie in the left and right directions in the scene 11, a decision is made whether the fish shades should be merged into one fish shade or separated into different fish shades. According to a rule (a first selection Select 2=1), the fish shades are not merged and when the two fish shades are separated from each other in the left and right directions (depth direction) by at least one pixel, the two fish shades are regarded to be different bodies. According to a rule (a second selection Select 2=2), the fish shades are merged together and are regarded to be the same fish shades when the fish shades are separated from each other by less than one pixel and when the fish shades are separated from each other by at least two pixels, they are regarded to be different bodies. According to a rule (an m-th selection Select 2=m), the fish shades are merged when they are separated from each other by less than m pixels and they are regarded as different bodies when the fish shades are separated by at least (m+1) pixels. These rules directly affect the counting of fish and are selected based on the backup of experimental and past data.

FIG. 18 shows an embodiment of the third prescription of the decision rule. According to this rule, when the fish shades 13 lie in the up and down (time axis) directions in the scene 11, a decision is made whether the fish shades should be merged into one fish shade or separated as different bodies. A rule (a first selection Select 3=1), a rule (a second selection Select 3=2) and a rule (an n-th selection Select 3=n) provide a decision whether the fish shades are merged together in the time axis direction or separated as different bodies corresponding to the number of separated lines, and are selected by a backup of experiments and the like.

Usually, a boundary processing according to the first prescription is carried out after carrying out the merge/ separation processing according to the second and third prescriptions.

FIG. 19 shows an embodiment of the fourth prescription of the decision rule. This prescription provides a decision whether the above merged or separated fish shades 13 are not counted by being regarded as noise or counted as effective fish shades.

According to a rule (a first selection Select 4=1), when the number of detection is one and when the number of pixel in one, this pixel is regarded as noise, and when at least two pixels are adjacent they are regarded to show a fish shade. According to a rule (a second selection Select 4=2), one pixel and two pixels which are adjacent in parallel in the right and left directions or in the up and down directions are regarded as noise, and two pixels adjacent in up and down in an oblique direction are regarded as a fish shade. According to a rule (a third selection Select 4=3), two or smaller pixels are regarded as noise and at least three pixels are regarded as a fish shade. The rule (the second selection) is based on the reasoning that pixels due to a reflected wave from a static position such as a bubble or a dust do not move with time and pixels due to a reflected wave from a fish body passing in the fish pass move with time, and this pattern is fairly well consistent based on experimental results of fry sweet-fish.

Figure 20:
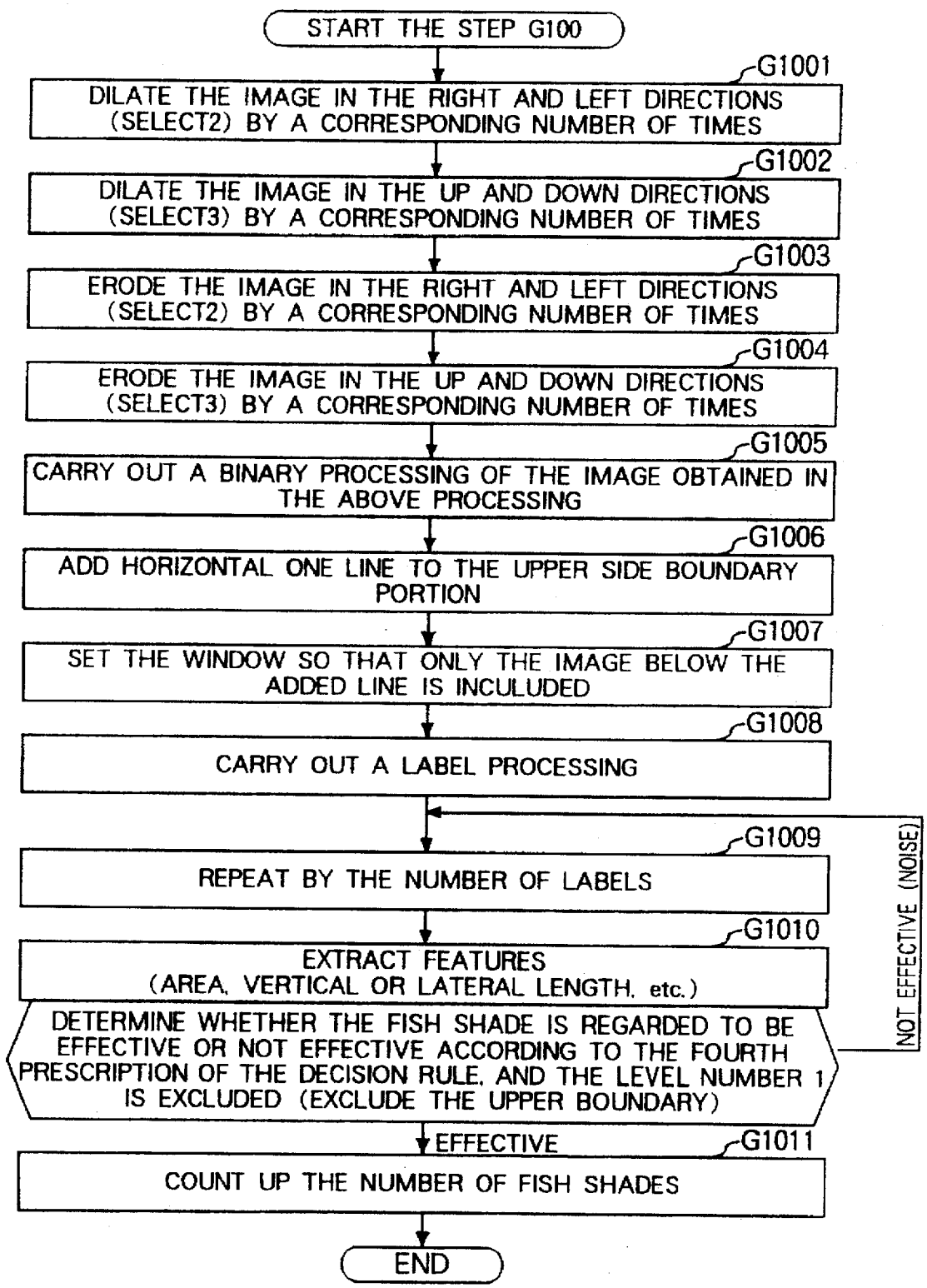
FIG. 20 is a flow chart for explaining the procedure of an image processing according to the fish shade decision rule.

FIG. 20 shows in detail the processing procedure (from the step G100 to the step G300 in FIG. 14) for counting fish shades by carrying out an image processing according to the above-described decision rule.

At first, a dilate processing is carried out for merging fish shades for the whole screen. First, based on the selection rule of the second prescription (select 2) of the decision rule, the image is dilated in the left and right directions by the number which suits the selection rule and the fish shades adjacent in the left and right directions are merged (step G1001). In this case, algorithms of expression 2 and expression 3 to be described later are used suitably. Next, based on the selection rule of the second prescription (select 3), the image is dilated in the up and down directions by the number which suits the selection rule and the fish shades adjacent in the up and down directions are merged (step G1002).

Next, an erode processing is carried out. First, the image is eroded by the number by which the image has been dilated in the left and right directions at the step G1001 and fish shades not merged in the left and right directions are separated (step G1003). Further, the image is eroded by the number by which the image has been dilated in the up and down directions at the step G1002 and fish shades not merged in the up and down directions are separated (step G1004).

When a merge or separation processed image is a variable-density image, a binarization processing is carried out at a suitable threshold vale (step G1005) and a boundary processing according to the selection rule of the first prescription (select 1) of the decision rule is carried out (steps G1006 and step G1007). In the present example, a horizontal line is added to an up and down side boundary 25 and a decision is made based on whether a fish shade image adjacent to this added line is to be included or not. With the above-described processing, a fish shade count image is produced.

In order to take out fish shades one by one from the produced count image, each fish shade is labeled (step G1008), and features are extracted for each labeled fish shade so that noise and effective fish shades are discriminated according to the fourth prescription of the decision rule (step G1010). This processing is repeated by the number of the labeling and the number of fish is counted up for the effective fish shades (step G1011). During the repeat processing of the fish counting, the coordinates of the upper end portion of the fish shades are calculated to check whether they are within the scene.

Figure 21:
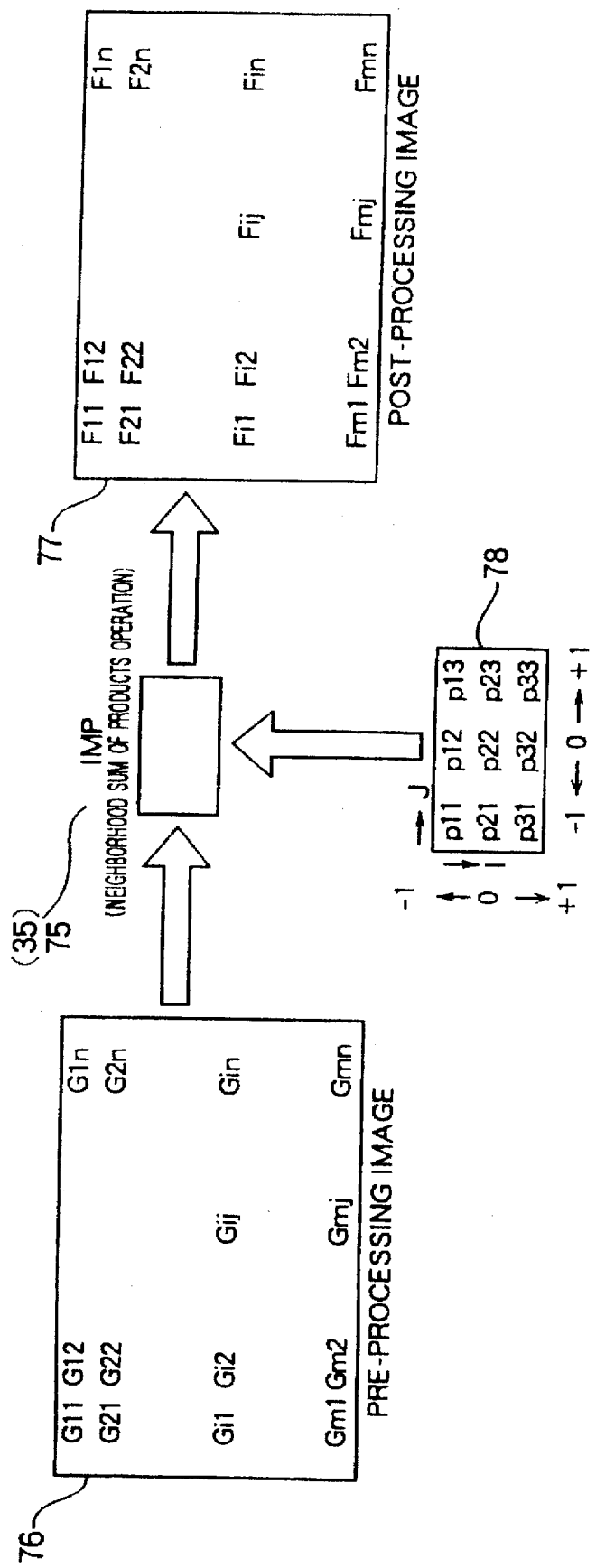
FIG. 21 is a drawing for explaining the image processing of a merging and a separation.

FIG. 21 shows in a schematic diagram the arithmetic processing of merge and separation operations for dilating and eroding an image in the left and right directions and up and down directions by the IMP 35.

At first, adjacent nine pixels including a focussed pixel are taken into a neighborhood sum of products operating unit 75 of the IMP 35 from the output image (a preprocessing image) 76 of the fish shade image producing unit 3 and these taken-in pixels are calculated with constant parameters 78 (a 3'3 matrix). Results of the calculation are set to corresponding positions of a postprocessing image 77. This operation is carried out for the whole of the postprocessing image.

Details of the taken-in nine pixels including the focussed pixel and the operation of the constant parameters 78 will be explained below. It is assumed that the adjacent nine pixels including the focussed pixel at the center are expressed as G (i+I, j+J) and the constant parameters 78 are expressed as p (I, J).

The constant parameters p to be used in the following expressions of each image processing are collectively shown in Table 1.

TABLE 1

| Processing number | Constant parameter (p) | |
|---|---|---|
| 1 | $p = \begin{vmatrix} 0 & 0 & 0 \\ 1 & 1 & 1 \\ 0 & 0 & 0 \end{vmatrix}$ | |
| 2 | (Dilated or eroded only leftwards) $p = \begin{vmatrix} 0 & 0 & 0 \\ 1 & 1 & 0 \\ 0 & 0 & 0 \end{vmatrix}$ | (Dilated or eroded only rightwards) $p = \begin{vmatrix} 0 & 0 & 0 \\ 0 & 1 & 1 \\ 0 & 0 & 0 \end{vmatrix}$ |
| 3 | $p = \begin{vmatrix} 0 & 1 & 0 \\ 0 & 1 & 0 \\ 0 & 1 & 0 \end{vmatrix}$ | |
| 4 | (Dilated or eroded only downwards) $p = \begin{vmatrix} 0 & 0 & 0 \\ 0 & 1 & 0 \\ 0 & 1 & 0 \end{vmatrix}$ | (Dilated or eroded only upwards) $p = \begin{vmatrix} 0 & 1 & 0 \\ 0 & 1 & 0 \\ 0 & 0 & 0 \end{vmatrix}$ |
| 5 | $p = \begin{vmatrix} 0 & 1 & 0 \\ 0 & 1 & 0 \\ 0 & 1 & 0 \end{vmatrix}$ | |
| 6 | $p = \begin{vmatrix} 1 & 1 & 1 \\ 1 & 1 & 1 \\ 1 & 1 & 1 \end{vmatrix}$ | |

(1) The fish shade is dilated by one pixel in the left and right directions respectively and the left and right distance is reduced by two pixels by one processing.

An algorithm to be used for this image processing is an expression 2. The constant parameter p as shown by the processing number 1 in Table 1 is used for this expression.

$$F(i,j) = \text{MAX}[\text{FILTER}(p(I,J), G(i+I, i+J))] \quad (2)$$

$$I = -1, 0, +1 \quad J = -1, 0, +1$$

For FILTER (P,M), the element of G is disregarded when the element of p is 0. MAX( ) takes a maximum value of corresponding elements.

(2) The fish shade is dilated by one pixel in the left or right direction and the left and right distance is reduced by one pixel by one processing.

The expression 2 is used for this image processing and the parameter p as shown by the processing number 2 in Table 1 is used.

(3) The fish shade is eroded by one pixel in the up and down directions respectively and the up and down distance is increased by two pixels by one processing.

An expression 3 is used for this image processing and the parameter p as shown by the processing number 3 in Table 1 is used.

$$F(i,j) = \text{MIN}[\text{FILTER}(p(I,J), G(i+I, j+J))] \quad (3)$$

$$I = -1, 0, +1 \quad J = -1, 0, +1$$

MIN( ) takes a minimum value of corresponding elements.

(4) The fish shade is eroded by one pixel in the up or down direction and the up and down distance is increased by one pixel by one processing.

The expression 3 is used for this image processing and the parameter p as shown by the processing number 4 in Table 1 is used.

(5) The fish shade is dilated by one pixel in the up and down directions respectively and the up and down distance is reduced by two pixels by one processing.

The expression 2 is used for this image processing and the parameter p as shown by the processing number 5 in Table 1 is used.

(6) The fish shade is dilated by one pixel in the up or down direction and the up and down distance is reduced by one pixel by one processing.

The expression 2 is used for this image processing and the parameter p as shown by the processing number 4 in Table 1 is used.

(7) The fish shade is dilated by one pixel in the up and down directions respectively and the up and down distance is reduced by two pixels by one processing.

The expression 2 is used for this image processing and the parameter p as shown by the processing number 3 in Table 1 is used.

(8) The fish shade is eroded by one pixel in the up and down directions respectively and the up and down distance is increased by two pixels by one processing.

The expression 3 is used for this image processing and the parameter p as shown by the processing number 5 in Table 1 is used.

(9) The fish shade is dilated by one pixel in the up and down directions and left and right respectively at the same time and the up and down distance and left and right distance is reduced by two pixels by one processing.

The expression 2 is used for this image processing and the parameter p as shown by the processing number 6 in Table 1 is used.

(10) The fish shade is eroded by one pixel in the up and down directions and left and right respectively at the same time and the up and down distance and left and right distance is increased by two pixels by one processing.

The expression 3 is used for this image processing and the parameter p as shown by the processing number 9 in Table 1 is used.

(11) The fish shade is eroded by one pixel in the left and right directions respectively at the same time and the up and down distance is increased by two pixels by one processing.

The expression 3 is used for this image processing and the parameter p as shown by the processing number 1 in Table 1 is used.

(12) The fish shade is eroded by one pixel in the left or right direction and the left and right distance is increased by one pixel by one processing.

The expression 3 is used for this image processing and the parameter p as shown by the processing number 2 in Table 1 is used.

By suitably combining the above-described image processing algorithms of (1) to (12) according to the decision rule, merging or separation of adjacent fish shades can be carried out in detail according to the distance between fish shades. Further, an operator can easily perform an optimum selection of processing even if the operation has no special knowledge of the image.

Next, the data processing for registering in the data base the number of fish shades counted by the fish shade count image processing unit 4 and outputting various lists and graphs will be explained.

Figure 22:
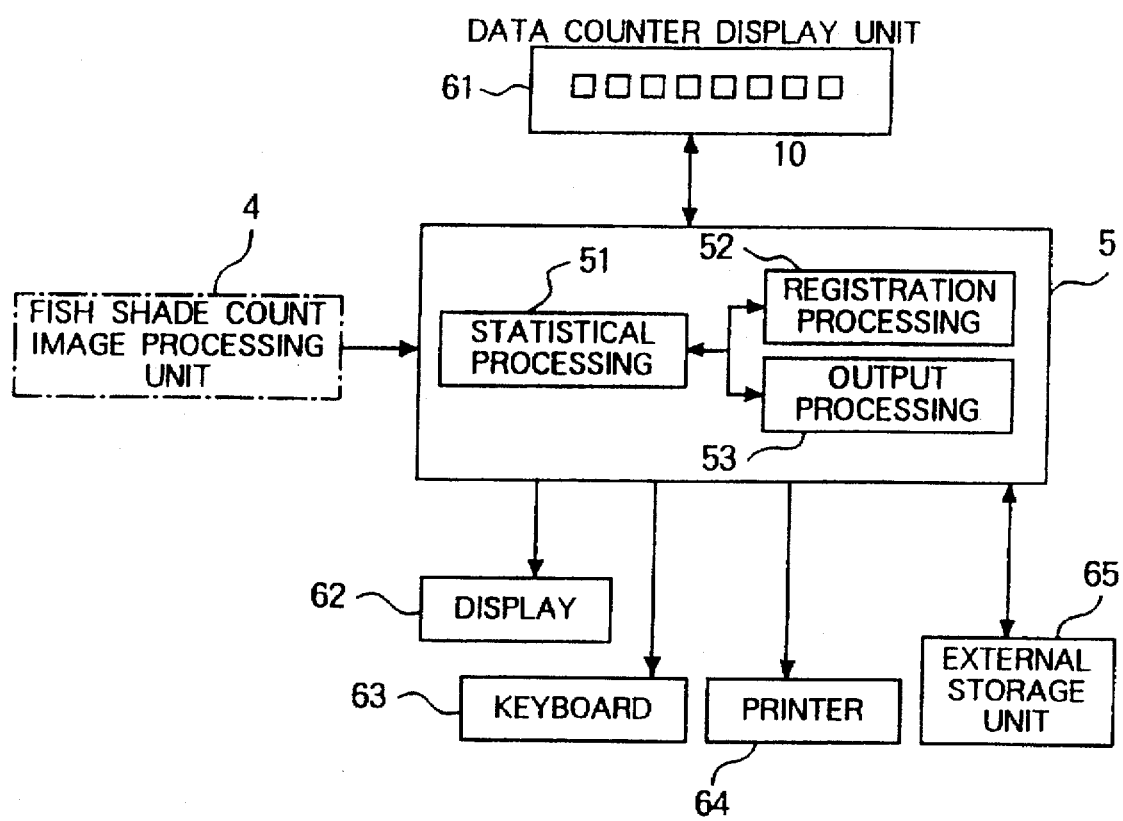
FIG. 22 is a drawing for showing the structure of the fish number data processing unit.

FIG. 22 shows the structure of the fish number data processing unit. The data processing unit 5 is connected with a data counter display unit 61, a display 62, a keyboard 63, a printer 64, and an external storage unit 65 for storing the data base, etc.

The data processing unit 5 is structured by a statistical processing unit 51 for accumulating the number of fish from the fish shade count image processing unit 4, and calculating a peak value, an average and a deviation, etc., a register unit 52 for editing the calculated data in various types of files by objects and storing the edited results in the data base, and a retrieve and output processing unit 53 for retrieving the data base and outputting data to the display unit or the like.

Figure 23:
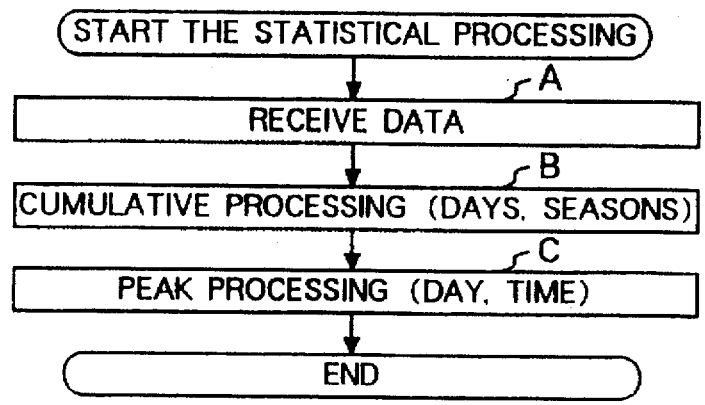
FIG. 23 is a flow chart for showing the processing procedure of the statistical processing unit.

FIG. 23 shows an example of the processing of the statistical processing unit 51. When the statistical processing unit 51 has received the numbers of fish for every one minute from the fish shade count image processing unit 4 (A), the statistical processing unit accumulates the data in units of time, day, month, season, etc. (B) and calculates a peak value in time and day units (C). Further, the statistical processing unit suitably performs a data processing such as an obtaining of variations from an average value, historical data, etc.

Figure 24:
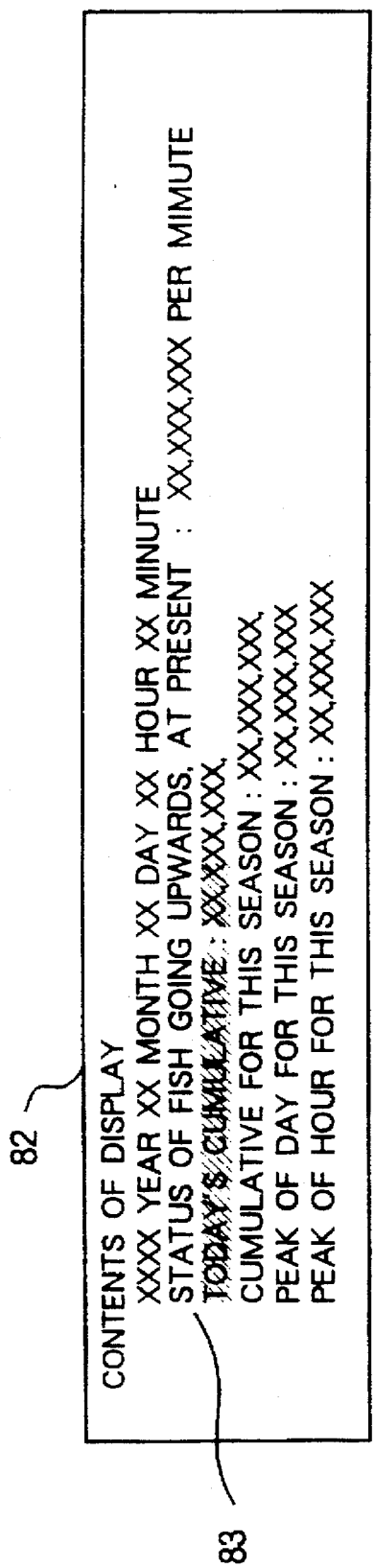
FIG. 24 is a drawing for showing a display example of the fish count statistical data.

The data retrieval and output unit 53 has a function of producing lists and graphs and outputs data to the display unit and the printer. FIG. 24 shows an example of the display of statistical data by the counter display unit 61. The counter display unit 61 scrolls characters of about eight letters and displays statistical data by sequentially updating the data.

According to the present embodiment, dynamic images of fish shades that have been detected by ultrasonic waves are taken in for each predetermined image range, fish shades are merged for the same fish body and fish shades are separated for different fish bodies based on the fish shade decision rule, noises due to bubbles and the like in the water are eliminated, and then the number of fish is counted. Accordingly, the number of fish can be counted correctly.

Further, the fish counter according to the present invention achieves a completely automatic counting so that a long-term continuous counting can be done and effective data for a fishing resource can be obtained easily. Furthermore, the fish counter is structured so that a selection of rules and the parameter setting unit can be changed based on experiments and past actual data. Thus, a counting which best meets the situation can be achieved.

In the above-described embodiment, a signal received at one time by the ultrasonic wave sensor becomes a none image line and an updating and a scrolling are repeated in a predetermined cycle so that a plane image of fish shades that change with time is obtained. However, a similar image can also be obtained by disposing a plurality of ultrasonic wave sensors along the flow direction of the fish pass and taking in the received signals of all the sensors at one time. According to this method, the processing for producing a fish shade image is facilitated although the number of sensors is increased.

In the above-described embodiment, a fish shade image which shows a presence or absence of a received signal of the ultrasonic wave sensor 2 is expressed by binary values or in a shaded image. However, when a distance between the sensor and a fish body is detected by the time from an emission of an ultrasonic wave to the receiving of a signal and when this distance of fish body is corresponded to the number of pixels and a shaded image is produced, the degree of distance between fish can be obtained and the precision of the counting of the number of fish in a densely crowded fish shade image can be further improved.

Further, the image take-in processing of the count scene from the fish shade dynamic image according to the present embodiment is not limited to fish shades. This image take-in processing can also be widely applied to a counting system for counting mobil units such as, for example, the counting of a traffic volume of cars that pass a predetermined counting area of a road by an image processing like a TV camera or the like.

Another embodiment of the present invention will be explained below.

The fish counting according to the ultrasonic wave sensor has characteristics that it is possible to continuously count fish even if water is polluted or even at night. However, this system has a limitation to the counting range. To solve this problem, the counting range is increased by installing the ultrasonic wave sensors in the water depth direction on both sides of the fish pass, or the width direction of the fish pass, or both the water depth direction and the width direction. However, when the fish pass is wide, it is difficult to cover all the range of fish going upwards, and an increase in the number of sensors, particularly the combination of the depth direction and the width direction requires a stereoscopic processing of fish shades, which results in a complicated image processing.

Figure 25:
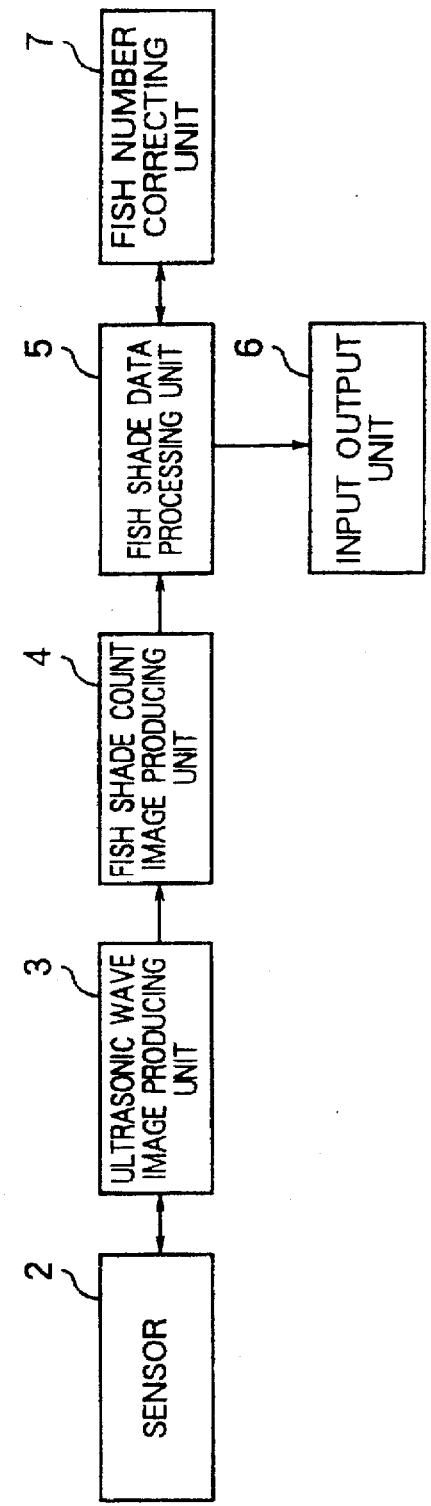
FIG. 25 is a block diagram for showing another embodiment of the present invention.

In order to solve the above-described problem, the present invention has made it possible to achieve a method for estimating the number of fish going upwards in a wider area based on a statistical method. FIG. 25 shows the fish counter according to one embodiment of the present invention. In FIG. 25, symbol numbers which are the same as those in FIG. 1 represent the same units or like. The present embodiment is different from the embodiment shown in FIG. 1 in that a fish number correcting unit has been provided. The fish number correcting unit 7 estimates the number of fish including the fish outside the counting range by utilizing the fish number correcting unit 7 based on the fish number counted in the same manner as described in the above embodiment. The function of the fish number correcting unit 7 will be explained below.

Figure 26:
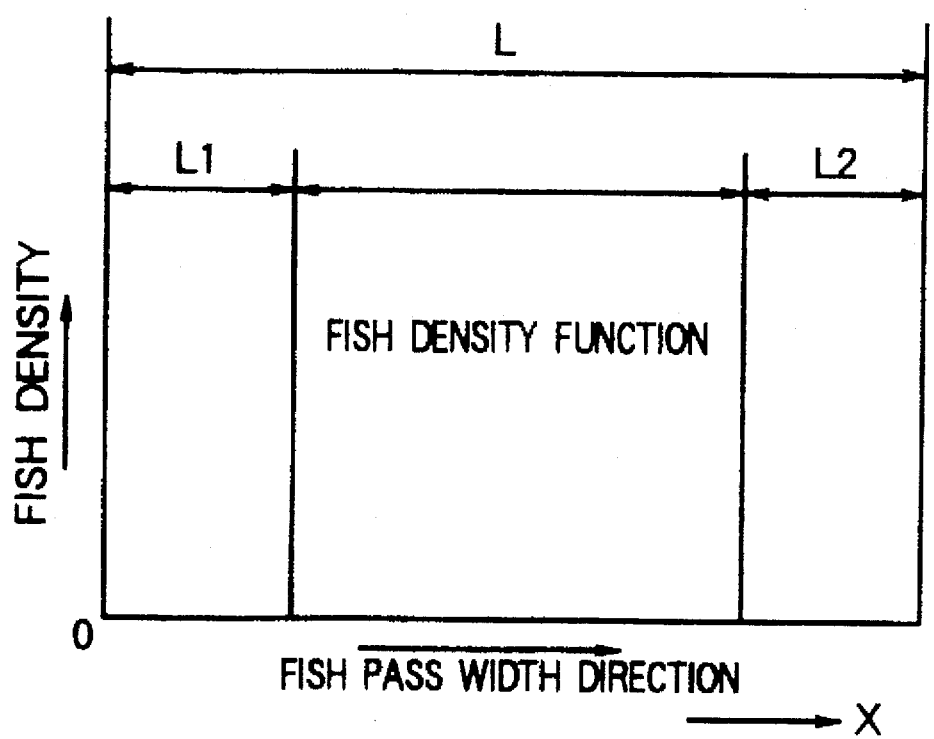
FIG. 26 is an explanatory diagram for showing one example of fish density functions of fish passing in the width direction cross section of the fish pass.

FIG. 26 shows a fish density function in the width direction passing the cross section of the fish pass. This data is produced from the actual count data based on an underwater camera or the like or fish collection, and the functional pattern changes according to the fish type (season) and time zone.

Assume that the detection range of the sensor 2 installed in the water depth direction on both sides of the fish pass cross section are L1 and L2 for the width L of the fish pass cross section. The range of the L1 and L2 can be counted automatically. The fish density function can be defined to have a relation as shown below assuming that the number of fish passing upwards per unit width of the fish pass per unit time is FISH (x, t).

The number of fish FCs1 passing upwards in front of a first sensor from the fish pass wall 62 by the distance L1 during a period from the time T1 to T2 is shown by an expression 4.

$$FCs1 = \int_{T=T1}^{T2} \int_{X=0}^{L1} FISH(x,t)dxdT \quad (4)$$

The number of fish FCs2 passing upwards in front of a second sensor during a period from the time T1 to T2 is shown by an expression 5.

$$FCs2 = \int_{T=T1}^{T2} \int_{X=L-L2}^{L} FISH(x,t)dxdT \quad (5)$$

The number of fish FCg passing upwards along the whole width of one fish pass during a period from the time T1 to T2 is shown by an expression 6.

$$FCg = \int_{T=T1}^{T2} \int_{X=0}^{L} FISH(x,t)dxdT \quad (6)$$

A true value of the fish density function in the present embodiment is produced based on sampling data such as the types of fish (season), time, weather, etc. combined with image picked-up data by the under-water camera and fish collection. By comparing the true value of the fish density function with the fish density function obtained by the expressions 4 to 6 based on the fish number counted by the present unit, a conversion coefficient 106 for estimating from the count value the number of fish in the whole area can be obtained as shown in an expression 7.

$$\Omega = (FCs1 + FCs2)/(FCs1' + FCs2') \quad (7)$$

where, $\Omega$: a conversion coefficient from a count value to a true value

FCs1': a count value (sensor 1) of the present unit, a period from T1 to T2

FCs2': a count value (sensor 2) of the present unit, a period from T1 to T2

FCs1: an actual count value for the same range as the sensor 1 (based on an visual inspection)

FCs2: an actual count value for the same range as the sensor 2 (based on an visual inspection)

As described above, the fish density function of a plurality of cases based on the actual count data is compared in advance with the fish density function based on the count data, and a calculation is carried out by the fish number correcting unit 7 based on the expression 8 to which the conversion coefficient $\Omega$ has been set and a true number of fish going upwards is estimated from the counted value.

$$fC12 = \Omega \cdot (fC1' + fC2') \quad (8)$$

where, fc1': a count value of the present unit at a normal time (sensor 1)

fc2': a count value of the present unit at a normal time (sensor 2)

fc12: an estimated number of fish going upwards based on a true value for the same rage as the sensor 1 and the sensor 2

$\Omega$: a conversion coefficient

Further, for estimating the number of fish going upwards fcg over the whole width of the fish pass from two results of counting at both sides of one fish pass, an expression 9 is used.

$$fcg = \Omega' \cdot (fc1' + fc2') \quad (9)$$

where, fcg: an estimated number of fish going upwards over the whole width of the fish pass fc1': a count value of the present unit at a normal time (sensor 1)

fc2': a count value of the present unit at a normal time (sensor 2)

$\Omega'$: a conversion coefficient where $\Omega' = F_{cg}/(FCs1' + FCs2')$

FCg is based on the expression 6.

FCs1' and FCs2' are the same as those in the expression 7.

Considering one fish pass, in the case of fry sweetfish, at least 95% of the fish go upwards near both banks and therefore most of the fish pass in the detection range of the sensor. However, in the case of fish like carp and trout, a proportion of these fish go upwards in the center portion of the water flow. Thus, two sets of sensors installed at both banks of the fish pass can obtain an approximate number of the fish passing the fish pass. However, when it is desired to obtain the number with a higher precision, the number of fish closer to a true value within the same range of detection by the sensor can be estimated by the expression 8. When the fish pass has a large width, the number of fish in the whole fish pass based on the two sensors at both sides can be estimated by the expression 9.

Further, the number of fish fcr for the whole system (the whole of a fish farming pool, a lake, a river, etc.) based on the total value of a plurality of sensors can be estimated by the expression 10.

$$frc = \Omega'' \cdot (fc1' + \cdots + fcn') \quad (10)$$

where, fcr: an estimated number of fish going upwards in the whole system fc1': a count value by the unit of the present invention in the fish pass 1 fcn': a count value by the unit of the present invention in the fish pass n $\Omega''$: a conversion coefficient $\Omega''$ = (the number of fish going upwards over the whole width of the river during a predetermined period)/ (FCs1'+ - - +FCsn')

As explained above, the method of estimating the total number of fish going upwards from a counted value of a part of the system based on the sampling data and experimental rule relating to the fish pass distribution of the fish going upwards and the number of fish utilizes the features of the fish going upwards. Therefore, the number of fish can be estimated with a high precision in a simple method and this method has an effect of substantially reducing the cost counting.

According to the fish counting method of the present invention, the number of fish is counted by carrying out a correct image processing of fish shades based on the decision rule, so that this method has an effect that the fish number can be counted correctly.

According to the fish counting method of the present invention, the number of fish can be counted automatically by processing an ultrasonic wave dynamic image of the fish that pass the fish pass such as a fish farming pool, a river, or the like, so that the number of fish can be counted continuously without regard to a dustiness of water and day and night. Thus, there is an effect that the number of fish can be counted over a long period.

Further, according to the fish counter of the present invention, the number of fish going upwards can be estimated for the whole system of the fish pass based on the count value of a part of the system, so that the cost of counting can be reduced substantially.

Further, according to the mobile objects counting method of the present invention, a boundary processing is carried out for eliminating a duplication of mobile objects that lie at the boundary when taking in a count screen from a dynamic image, so that an accurate counting of the mobile objects can be achieved.

What is claimed is:

1. A fish counting method for counting a number of fish by emitting an ultrasonic wave to a predetermined area where fish pass in a body of water and receiving reflected waves from fish bodies, wherein, a line image is produced in a predetermined cycle in a horizontal or vertical direction which shows a presence or absence of said reflected wave by a presence or absence of a pixel signal by corresponding said presence or absence of reflected wave to a depth direction or a width direction of a cross section of said predetermined area, a predetermined number of stored line images are scrolled in a vertical or horizontal direction in said predetermined cycle and an ultrasonic wave fish shade image is produced according to a plane image including a new line image, an image processing in a fish shade unit is carried out for said pixel signal or a group of pixel signals shown in said plane image on the basis of a predetermined fish shade decision rule in order to obtain a count fish shade image in such a manner that when a distance between adjacent left and right and/or up and down pixel signals is not larger than a predetermined distance, said adjacent pixel signals are merged into the same fish shade and when a distance between adjacent left and right and/or up and down pixel signals is larger than said predetermined distance, said adjacent pixel signals are separated from each other as different fish shades, and a number of fish is counted based on said predetermined fish shade decision rule utilizing the merging and separating processes effected in accordance with the distance between adjacent pixel images.

2. A fish counting method according to claim 1, wherein said image processing is carried out in such a manner that when said pixel signal or said group of pixel signals conforms with a noise pattern defined by said predetermined decision rule, said pixel signal or said group of pixel signals is erased.

3. A fish counting method according to claim 1, wherein said merging is characterized in that after corresponding pixel signals have been put together by carrying out a dilate processing by at least once in the left and right and up and down directions, an erode processing is carried out in the left and right and up and down directions by said number of dilate processing.

4. A fish counting method for counting a number of fish by emitting an ultrasonic wave to a predetermined area where fish pass in a body of water and receiving reflected waves from fish bodies, wherein, an ultrasonic wave fish shade image is produced for showing changes of fish shades as a pixel signal by periodically storing said reflected waves received from a cross section of said predetermined area, an area of a group of crowded pixels in said ultrasonic wave fish shade image is calculated, and when said calculated area is not larger than a predetermined area an image processing in a fish shade unit is carried out to said group of pixels of said ultrasonic wave fish shade based on a fish shade decision rule and the number of fish is counted, and when said calculated area exceeds said predetermined area, a shape estimation is carried out on the basis of the calculation of a feature including number of holes in a group of said pixels in such a manner that when the number of holes is smaller than a predetermined value, it is estimated as a large-type image of one fish and when the number of holes is larger than the predetermined value, it is estimated as a small-type fish crowded image, relational data between an area value of a group of pixels and a number of fish stored in advance based on past actual data is referred to and the number of fish corresponding to said area value of said corresponding group of pixels is estimated.

5. A fish counting method for counting a number of fish by emitting an ultrasonic wave to a predetermined area where fish pass in a body of water and receiving reflected waves from fish bodies, wherein, an ultrasonic wave fish image for showing changes of fish shades is produced by periodically storing said reflected waves received from a part of area of a cross section of said predetermined area, said image showing a presence or absence of said reflected wave by a presence or absence of a pixel signal, an image processing in a fish shade unit is carried out to said ultrasonic wave fish shade image based on a fish shade decision rule in which adjacent pixel signals are merged into the same fish shade if a distance between adjacent pixel signals is not larger than a predetermined distance, and adjacent pixel signals are separated from each other as different fish shades when a distance between adjacent pixel signals is larger than said predetermined distance, and the number of fish and a fish density distribution of fish passing said part area of said cross section of said fish pass during a predetermined period is counted based on said fish shade decision rule utilizing the merging and separating processes effected in accordance with the distance between adjacent pixel images, and a fish density distribution of a whole area of said fish pass cross section stored in advance based on past actual data and said counted number of fish are referred to, and the number of fish of a whole area of a fish pass corresponding to said counted number of fish is estimated from a correlation between said part area fish density distribution and said whole area fish density distribution.

6. A method for counting a number of mobile objects by processing an image signal of a mobile object that pass a predetermined area, wherein corresponding to an orthogonal direction of a direction of movement of said mobile objects, a line image in a horizontal or vertical direction for showing said mobile objects in a pixel signal is produced in a predetermined cycle, and a plane dynamic image including a new line image is produced by scrolling a predetermined number of stored line images in a vertical or horizontal direction in said predetermined cycle, and a one-scene plane image is taken in from said plane dynamic image each time when a predetermined number of line images are updated, a count image area is set based on a boundary line signal to be set at a predetermined position excluding at least one line image from an upper end of a taken-in plane image downwards, a predetermined boundary processing is carried out for a pixel signal or a group of pixel signals that lie at said predetermined position, and the number of mobile objects in said count image area is counted.

7. A method for counting mobile objects according to claim 6, wherein said boundary line signal is detected by detecting a marker that moves in synchronism with a scroll of said line image by a window to be set at said predetermined position.

8. A fish counter for counting a number of fish by emitting an ultrasonic wave to a predetermined area where fish pass in a body of water and receiving reflected waves from fish bodies, comprising:

an ultrasonic wave sensor installed in a depth direction or a width direction of a cross section of said fish pass, having at least one oscillator laid out for transmitting an ultrasonic wave and receiving reflected waves, ultrasonic wave image producing means for periodically storing reflected waves from said ultrasonic wave sensor based on a pixel signal corresponding to said depth direction or said width direction and for producing an ultrasonic wave fish shade image for showing a fish shade and changes of said fish shade, fish shade count image producing means for taking in one scene for counting from said ultrasonic wave fish shade image, producing a fish shade count image of said scene by carrying out an image processing for discriminating the image for each fish shade unit and counting the number of fish according to this image, fish shade decision rule storing means that merges adjacent pixel images into the same fish shade when a distance between adjacent left and right and/or up and down pixel signals is not larger than a predetermined distance in said one scene, separates said adjacent pixel images from each other as different fish shades when a distance between said adjacent left and right and/or up and down pixel signals is larger than said predetermined distance, and erases said adjacent pixels when said pixel signal is a noise pattern, and carries out an image processing in said fish shade unit by referring to said decision rule in which said predetermined distance has been set, and output means for statistically processing the number of fish counted by said fish shade count image producing means and outputting a result.

9. A fish shade counter according to claim 8, wherein said fish shade count image producing means includes feature extracting means for obtaining an area and a shape of a pixel signal or a group of crowded pixel signals in one scene, includes fish number estimating means for deciding a shape according to said feature extracting means when said area obtained by said feature extracting means exceeds a predetermined area and estimating the number of fish from said area of a corresponding group of pixel signals, and carries out an image processing in said fish shade unit by referring to said fish shade decision rule storage means when an area obtained by said feature extracting means is not larger than a predetermined area.

10. A fish counter according to claim 8, wherein said fish shade count image producing means includes boundary processing means for including a pixel signal or a group of pixel signals that lie between a preceding scene and a current scene in either said preceding scene or said current scene when taking in one scene of said current scene that is in contact with one scene that has been taken in in said preceding scene, so that a duplicating fish shade is eliminated from said fish shade count image.

11. A fish counter according to claim 10, wherein said boundary processing means includes control information display means for displaying a marker during a slightly short period from an end point on the screen of said ultrasonic wave fish shade image in synchronism with a scroll (a horizontal scanning) of said ultrasonic wave fish shade image in order to obtain a take-in timing of a take-in image of said one scene in said ultrasonic wave fish shade image, and takes a display range of said marker as said take-in timing.

12. A fish counter for counting a number of fish by emitting an ultrasonic wave to a predetermined area where fish pass in a body of water and receiving reflected waves from fish bodies, comprising:

an ultrasonic wave sensor installed in a water depth direction of said predetermined area, having a plurality of oscillators laid out for transmitting an ultrasonic wave and receiving reflected waves, ultrasonic wave image producing means for periodically storing reflected waves from said ultrasonic wave sensor based on a pixel signal corresponding to said depth direction and producing an ultrasonic wave fish shade image for showing a fish shade and changes of said fish shade passing a detecting area of said sensor at a cross section of said predetermined area, fish shade count image producing means for carrying out a processing of taking in one scene for counting fish from said ultrasonic wave fish shade image, producing a fish shade count image of said scene by carrying out an image processing in fish shade unit, and counting fish in said sensor detecting area, and fish number correcting means for storing a fish number correction coefficient of said sensor detecting area to be determined by a relation between a whole-area fish density distribution of said cross section of said predetermined area and number of fish stored in advance based on past actual data and said whole area of said predetermined area, correcting a counted fish number in said sensor detecting area by said correction coefficient, and estimating the fish number in said whole area of said predetermined area.

13. A fish counting method according to claim 2, wherein said merging is characterized in that after corresponding pixel signals have been put together by carrying out a dilate processing by at least once in the left and right and up and down directions, an erode processing is carried out in the left and right and up and down directions by said number of dilate processing.

14. A fish counting method according to claim 2, wherein said count fish shade image for counting fish is produced as an effective image by taking in a plane image including said predetermined number of line images each time when said predetermined number of line images have been updated and by eliminating a predetermined number of line images from an upper end that forms a boundary with a plane image that has been taken in last time.

15. A method for counting mobile objects according to claim 7, wherein said boundary line signal is detected by detecting a marker that moves in synchronism with a scroll of said line image by a window to be set at said predetermined position.

16. A fish counter according to claim 9, wherein said fish shade count image producing means includes boundary processing means for including a pixel signal or a group of pixel signals that lie between a preceding scene and a current scene in either said preceding scene or said current scene that is in contact with one scene that has been taken in said preceding scene, so that a duplicating fish shade is eliminated from said fish shade count image.

* * * * *

UNITED STATES PATENT AND TRADEMARK OFFICE
CERTIFICATE OF CORRECTION

PATENT NO. : 5,692,064
DATED : November 25, 1997
INVENTOR(S) : Yoichi Takagi, et al It is certified that error appears in the above-indentified patent and that said Letters Patent is hereby corrected as shown below:

| Column | Line | |
|---|---|---|
| 13 | 14 | Change "3'3 matrix" to --3x3 matrix--. |
| 15 | 17 | Change "operation" to --operator--. |
| 17 | 39 | Change "106" to --$\Omega$--. |
| 17 | 67 | Change "$fC12=\Omega \cdot (fC1'+fC2')$" to --$fc12=\Omega \cdot (fc1'+fc2')$-- |

Signed and Sealed this

Eighteenth Day of August, 1998

Attest:

BRUCE LEHMAN

Attesting Officer

Commissioner of Patents and Trademarks